US012793001B2

(12) United States Patent
Smith et al.

(10) Patent No.: US 12,793,001 B2
(45) Date of Patent: Nov. 10, 2026

(54) CENTRALIZED MILESTONE RECORDATION FOR ROBOTIC PROCESS AUTOMATION SYSTEMS

(71) Applicant: Automation Anywhere, Inc., San Jose, CA (US)

(72) Inventors: Micah Daniel Smith, Cornelius, NC (US); Joao Paulo Caina, Cary, NC (US)

(73) Assignee: Automation Anywhere, Inc., San Jose, CA (US)

(*) Notice: Subject to any disclaimer, the term of this patent is extended or adjusted under 35 U.S.C. 154(b) by 235 days.

(21) Appl. No.: 18/377,806

(22) Filed: Oct. 8, 2023

(65) Prior Publication Data

US 2024/0257024 A1 Aug. 1, 2024

Related U.S. Application Data

(60) Provisional application No. 63/442,104, filed on Jan. 30, 2023.

(51) Int. Cl.
*G06Q 10/0639* (2023.01)
*G06Q 10/10* (2023.01)

(52) U.S. Cl.
CPC ....... *G06Q 10/06398* (2013.01); *G06Q 10/10* (2013.01)

(58) Field of Classification Search
CPC ............. G06Q 10/063; G06Q 10/0639; G06Q 10/06398; G06Q 10/10
See application file for complete search history.

(56) References Cited

U.S. PATENT DOCUMENTS

| | | | |
|---|---|---|---|
| 5,949,999 | A | 9/1999 | Song et al. |
| 5,983,001 | A | 11/1999 | Boughner et al. |
| 6,118,939 | A | 9/2000 | Nack |
| 6,133,917 | A | 10/2000 | Feigner et al. |
| 6,226,407 | B1 | 5/2001 | Zabih et al. |
| 6,389,592 | B1 | 5/2002 | Ayres et al. |

(Continued)

FOREIGN PATENT DOCUMENTS

| | | |
|---|---|---|
| EP | 3133539 | 2/2017 |
| EP | 3675008 | 7/2020 |

(Continued)

OTHER PUBLICATIONS

Al Sallami, Load Balancing in Green Cloud Computation, Proceedings of the World Congress on Engineering 2013 vol. Ii, Wce 2013, 2013, pp. 1-5 (Year: 2013).

(Continued)

*Primary Examiner* — William S Brockington, III
(74) *Attorney, Agent, or Firm* — Jason A. Smith; Shumaker, Loop & Kendrick, LLP

(57) ABSTRACT

Robotic process automation (RPA) systems with improved recordation and management of milestones concerning software robots that have executed are disclosed. One aspect of certain embodiments can support recordation of a milestone after a software robot completes its execution. The milestone being recorded can denote that the corresponding software robot has executed and its execution status. Additionally, the milestone can allow for greater performance and/or value monitoring.

19 Claims, 18 Drawing Sheets

(56) References Cited

U.S. PATENT DOCUMENTS

| | | | | |
|---|---|---|---|---|
| 6,427,234 | B1 | 7/2002 | Chambers et al. | |
| 6,473,794 | B1 | 10/2002 | Guheen et al. | |
| 6,490,449 | B1 | 12/2002 | Thibert | |
| 6,496,979 | B1 | 12/2002 | Chen et al. | |
| 6,640,244 | B1 | 10/2003 | Bowman-Amuah | |
| 6,704,873 | B1 | 3/2004 | Underwood | |
| 6,898,764 | B2 | 5/2005 | Kemp | |
| 6,954,747 | B1 | 10/2005 | Wang et al. | |
| 6,957,186 | B1 | 10/2005 | Guheen et al. | |
| 7,091,898 | B2 | 8/2006 | Arling et al. | |
| 7,246,128 | B2 | 7/2007 | Jordahl | |
| 7,398,469 | B2 | 7/2008 | Kisamore et al. | |
| 7,441,007 | B1 | 10/2008 | Kirkpatrick et al. | |
| 7,533,096 | B2 | 5/2009 | Rice et al. | |
| 7,568,109 | B2 | 7/2009 | et al. | |
| 7,571,427 | B2 | 8/2009 | Wang et al. | |
| 7,765,525 | B1 | 7/2010 | Davidson et al. | |
| 7,783,135 | B2 | 8/2010 | Gokturk | |
| 7,805,317 | B2 | 9/2010 | Khan et al. | |
| 7,805,710 | B2 | 9/2010 | North | |
| 7,810,070 | B2 | 10/2010 | Nasuti et al. | |
| 7,846,023 | B2 | 12/2010 | Evans et al. | |
| 8,028,269 | B2 | 9/2011 | Bhatia et al. | |
| 8,056,092 | B2 | 11/2011 | Allen et al. | |
| 8,095,910 | B2 | 1/2012 | Nathan et al. | |
| 8,132,156 | B2 | 3/2012 | Malcolm | |
| 8,209,738 | B2 | 6/2012 | Nicol et al. | |
| 8,234,622 | B2 | 7/2012 | Meijer et al. | |
| 8,245,215 | B2 | 8/2012 | Extra | |
| 8,352,464 | B2 | 1/2013 | Fotev | |
| 8,365,147 | B2 | 1/2013 | Grechanik | |
| 8,396,890 | B2 | 3/2013 | Lim | |
| 8,438,558 | B1 | 5/2013 | Adams | |
| 8,443,291 | B2 | 5/2013 | Ku et al. | |
| 8,464,240 | B2 | 6/2013 | Fritsch et al. | |
| 8,498,473 | B2 | 7/2013 | Chong et al. | |
| 8,504,803 | B2 | 8/2013 | Shukla | |
| 8,631,458 | B1 | 1/2014 | Banerjee | |
| 8,682,083 | B2 | 3/2014 | Kumar et al. | |
| 8,713,003 | B2 | 4/2014 | Fotev | |
| 8,724,907 | B1 | 5/2014 | Sampson et al. | |
| 8,769,482 | B2 | 7/2014 | Batey et al. | |
| 8,819,241 | B1 | 8/2014 | Washburn | |
| 8,819,253 | B2 | 8/2014 | Simeloff | |
| 8,832,048 | B2 | 9/2014 | Lim | |
| 8,874,685 | B1 | 10/2014 | Hollis et al. | |
| 8,943,493 | B2 | 1/2015 | Schneider | |
| 8,965,905 | B2 | 2/2015 | Ashmore et al. | |
| 8,966,458 | B2 | 2/2015 | Asai | |
| 9,032,314 | B2 | 5/2015 | Mital et al. | |
| 9,104,294 | B2 | 8/2015 | Forstall et al. | |
| 9,171,359 | B1 | 10/2015 | Lund | |
| 9,213,625 | B1 | 12/2015 | Schrage | |
| 9,251,413 | B2 | 2/2016 | Meler | |
| 9,278,284 | B2 | 3/2016 | Ruppert et al. | |
| 9,444,844 | B2 | 9/2016 | Edery et al. | |
| 9,462,042 | B2 | 10/2016 | Shukla et al. | |
| 9,571,332 | B2 | 2/2017 | Subramaniam et al. | |
| 9,600,519 | B2 | 3/2017 | Schoning et al. | |
| 9,621,584 | B1 | 4/2017 | Schmidt et al. | |
| 9,934,063 | B2 | 4/2018 | Kaina | |
| 9,934,129 | B1 | 4/2018 | Budurean | |
| 9,946,233 | B2 | 4/2018 | Brun et al. | |
| 9,965,139 | B2 | 5/2018 | Nychis | |
| 9,990,347 | B2 | 6/2018 | Raskovic et al. | |
| 10,015,503 | B1 | 7/2018 | Ahammad | |
| 10,043,255 | B1 | 8/2018 | Pathapati et al. | |
| 10,282,280 | B1 | 5/2019 | Gouskova | |
| 10,489,682 | B1 | 11/2019 | Kumar et al. | |
| 10,542,030 | B2 | 1/2020 | Oberheide | |
| 10,552,540 | B2 | 2/2020 | Marascu et al. | |
| 10,592,738 | B2 | 3/2020 | Northrup | |
| 10,654,166 | B1 | 5/2020 | Hall | |
| 10,706,218 | B2 | 7/2020 | Milward et al. | |
| 10,706,228 | B2 | 7/2020 | Buisson | |
| 10,713,068 | B1 | 7/2020 | Zohar | |
| 10,936,807 | B1 | 3/2021 | Walters | |
| 10,963,731 | B1 | 3/2021 | Sarkar | |
| 11,099,972 | B2 | 8/2021 | Puszkiewicz | |
| 11,176,443 | B1 | 11/2021 | Selva | |
| 11,182,178 | B1 | 11/2021 | Singh et al. | |
| 11,182,604 | B1 | 11/2021 | Methaniya | |
| 11,210,075 | B2 * | 12/2021 | Bond | G06F 11/3466 |
| 11,243,803 | B2 | 2/2022 | Anand et al. | |
| 11,263,391 | B2 | 3/2022 | Potts | |
| 11,348,353 | B2 | 5/2022 | Sundell et al. | |
| 11,500,952 | B1 | 11/2022 | Gupta | |
| 11,614,731 | B2 | 3/2023 | Anand et al. | |
| 11,642,783 | B2 | 5/2023 | Han et al. | |
| 11,693,923 | B1 | 7/2023 | Pallikonda | |
| 11,775,321 | B2 | 10/2023 | Singh et al. | |
| 11,775,339 | B2 | 10/2023 | Anand et al. | |
| 11,775,814 | B1 | 10/2023 | Anand et al. | |
| 11,782,734 | B2 | 10/2023 | Ginoya et al. | |
| 11,820,020 | B2 | 11/2023 | Goyal et al. | |
| 11,919,165 | B2 | 3/2024 | Singh | |
| 11,954,008 | B2 | 4/2024 | Kakhandiki et al. | |
| 12,002,245 | B2 | 6/2024 | Srivastava | |
| 12,017,362 | B2 | 6/2024 | Yu | |
| 12,190,620 | B2 | 1/2025 | Sathi et al. | |
| 12,197,927 | B2 | 1/2025 | Goyal et al. | |
| 2002/0029232 | A1 | 3/2002 | Bobrow et al. | |
| 2002/0129039 | A1 | 9/2002 | Majewsku | |
| 2003/0033590 | A1 | 2/2003 | Leherbauer | |
| 2003/0101245 | A1 | 5/2003 | Srinivasan et al. | |
| 2003/0114959 | A1 | 6/2003 | Sakamoto | |
| 2003/0159089 | A1 | 8/2003 | DiJoseph | |
| 2004/0083472 | A1 | 4/2004 | Rao et al. | |
| 2004/0122906 | A1 | 6/2004 | Goodman | |
| 2004/0153649 | A1 | 8/2004 | Rhoads | |
| 2004/0172526 | A1 | 9/2004 | Tann et al. | |
| 2004/0210885 | A1 | 10/2004 | Wang et al. | |
| 2004/0243994 | A1 | 12/2004 | Nasu | |
| 2005/0033777 | A1 | 2/2005 | Moraes | |
| 2005/0188357 | A1 | 8/2005 | Derks et al. | |
| 2005/0204343 | A1 | 9/2005 | Kisamore et al. | |
| 2005/0257214 | A1 | 11/2005 | Moshir et al. | |
| 2006/0095276 | A1 | 5/2006 | Axelrod et al. | |
| 2006/0150188 | A1 | 7/2006 | Roman et al. | |
| 2006/0218110 | A1 | 9/2006 | Simske et al. | |
| 2007/0030528 | A1 | 2/2007 | Quaeler et al. | |
| 2007/0089101 | A1 | 4/2007 | Romanovskiy | |
| 2007/0101291 | A1 | 5/2007 | Forstall et al. | |
| 2007/0112574 | A1 | 5/2007 | Greene | |
| 2007/0156677 | A1 | 7/2007 | Szabo | |
| 2007/0172063 | A1 | 7/2007 | Biggs | |
| 2007/0233741 | A1 | 10/2007 | Shen | |
| 2008/0005086 | A1 | 1/2008 | Moore | |
| 2008/0027769 | A1 | 1/2008 | Eder | |
| 2008/0028392 | A1 | 1/2008 | Chen et al. | |
| 2008/0133052 | A1 | 6/2008 | Jones | |
| 2008/0209392 | A1 | 8/2008 | Able et al. | |
| 2008/0222454 | A1 | 9/2008 | Kelso | |
| 2008/0263024 | A1 | 10/2008 | Landschaft et al. | |
| 2008/0310625 | A1 | 12/2008 | Vanstone | |
| 2009/0037509 | A1 | 2/2009 | Parekh et al. | |
| 2009/0103769 | A1 | 4/2009 | Milov et al. | |
| 2009/0116071 | A1 | 5/2009 | Mantell | |
| 2009/0172814 | A1 | 7/2009 | Khosravi et al. | |
| 2009/0199160 | A1 | 8/2009 | Vaitheeswaran et al. | |
| 2009/0217309 | A1 | 8/2009 | Grechanik et al. | |
| 2009/0249297 | A1 | 10/2009 | Doshi et al. | |
| 2009/0304295 | A1 | 12/2009 | Mori | |
| 2009/0313229 | A1 | 12/2009 | Fellenstein et al. | |
| 2009/0320002 | A1 | 12/2009 | Peri-Glass et al. | |
| 2010/0023602 | A1 | 1/2010 | Martone | |
| 2010/0023933 | A1 | 1/2010 | Bryant et al. | |
| 2010/0077475 | A1 | 3/2010 | Deschenes | |
| 2010/0100605 | A1 | 4/2010 | Allen et al. | |
| 2010/0106671 | A1 | 4/2010 | Li et al. | |
| 2010/0138015 | A1 | 6/2010 | Colombo et al. | |
| 2010/0235433 | A1 | 9/2010 | Ansari et al. | |
| 2010/0251163 | A1 | 9/2010 | Keable | |
| 2010/0275113 | A1 | 10/2010 | Santos | |

(56) References Cited

U.S. PATENT DOCUMENTS

| | | | |
|---|---|---|---|
| 2011/0022578 A1 | 1/2011 | Fotev | |
| 2011/0047488 A1 | 2/2011 | Butin | |
| 2011/0055484 A1 | 3/2011 | Eichenberger | |
| 2011/0106284 A1 | 5/2011 | Catoen | |
| 2011/0145807 A1 | 6/2011 | Molinie et al. | |
| 2011/0197121 A1 | 8/2011 | Kletter | |
| 2011/0258195 A1 | 10/2011 | Welling | |
| 2011/0267490 A1 | 11/2011 | Goktekin | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0011458 A1 | 1/2012 | Xia et al. | |
| 2012/0042281 A1 | 2/2012 | Green | |
| 2012/0124062 A1 | 5/2012 | Macbeth et al. | |
| 2012/0131456 A1 | 5/2012 | Lin et al. | |
| 2012/0143941 A1 | 6/2012 | Kim | |
| 2012/0266149 A1 | 10/2012 | Lebert | |
| 2012/0324333 A1 | 12/2012 | Lehavi | |
| 2012/0330940 A1 | 12/2012 | Caire et al. | |
| 2013/0145006 A1 | 6/2013 | Tammam | |
| 2013/0173648 A1 | 7/2013 | Tan et al. | |
| 2013/0227535 A1 | 8/2013 | Kannan | |
| 2013/0236111 A1 | 9/2013 | Pintsov | |
| 2013/0290318 A1 | 10/2013 | Shapira et al. | |
| 2013/0301935 A1 | 11/2013 | Xue | |
| 2014/0036290 A1 | 2/2014 | Miyagawa | |
| 2014/0045484 A1 | 2/2014 | Kim et al. | |
| 2014/0075371 A1 | 3/2014 | Carmi | |
| 2014/0181705 A1 | 6/2014 | Hey et al. | |
| 2014/0189576 A1 | 7/2014 | Carmi | |
| 2014/0282125 A1 | 9/2014 | Duneau | |
| 2014/0379666 A1 | 12/2014 | Bryon | |
| 2015/0082280 A1 | 3/2015 | Betak et al. | |
| 2015/0121179 A1 | 4/2015 | Saund | |
| 2015/0235193 A1 | 8/2015 | Cummings | |
| 2015/0301926 A1 | 10/2015 | Giannelos | |
| 2015/0310268 A1 | 10/2015 | He | |
| 2015/0347284 A1 | 12/2015 | Hey et al. | |
| 2016/0019049 A1 | 1/2016 | Kakhandiki et al. | |
| 2016/0034441 A1 | 2/2016 | Nguyen et al. | |
| 2016/0055376 A1 | 2/2016 | Koduru | |
| 2016/0063269 A1 | 3/2016 | Liden | |
| 2016/0078368 A1 | 3/2016 | Kakhandiki et al. | |
| 2017/0091615 A1 | 3/2017 | Liu | |
| 2017/0141926 A1 | 5/2017 | Xu et al. | |
| 2017/0221032 A1 | 8/2017 | Mazed | |
| 2017/0270431 A1 | 9/2017 | Hosabettu | |
| 2017/0339148 A1 | 11/2017 | Syomichev | |
| 2018/0063258 A1* | 3/2018 | Wang | H04L 65/613 |
| 2018/0113781 A1 | 4/2018 | Kim | |
| 2018/0144042 A1 | 5/2018 | Sheng | |
| 2018/0176416 A1 | 6/2018 | Ewans | |
| 2018/0189093 A1* | 7/2018 | Agarwal | G06F 9/5016 |
| 2018/0210824 A1 | 7/2018 | Kochura | |
| 2018/0218429 A1 | 8/2018 | Guo et al. | |
| 2018/0267885 A1 | 9/2018 | Budurean | |
| 2018/0275835 A1 | 9/2018 | Prag | |
| 2018/0276462 A1 | 9/2018 | Davis | |
| 2018/0321955 A1 | 11/2018 | Liu | |
| 2018/0322403 A1 | 11/2018 | Ron | |
| 2018/0349730 A1 | 12/2018 | Dixon | |
| 2018/0370029 A1 | 12/2018 | Hall | |
| 2019/0005050 A1 | 1/2019 | Proux | |
| 2019/0026215 A1 | 1/2019 | Agarwal | |
| 2019/0028587 A1 | 1/2019 | Unitt | |
| 2019/0034041 A1 | 1/2019 | Nychis | |
| 2019/0066012 A1 | 2/2019 | Abell | |
| 2019/0075169 A1 | 3/2019 | Behunin | |
| 2019/0095440 A1 | 3/2019 | Chakra | |
| 2019/0114370 A1 | 4/2019 | Cerino | |
| 2019/0126463 A1 | 5/2019 | Purushothaman | |
| 2019/0130094 A1 | 5/2019 | Votaw | |
| 2019/0141596 A1 | 5/2019 | Gay | |
| 2019/0188462 A1 | 6/2019 | Nishida | |
| 2019/0205636 A1 | 7/2019 | Saraswat | |
| 2019/0213822 A1 | 7/2019 | Jain | |
| 2019/0250891 A1 | 8/2019 | Kumar | |
| 2019/0266692 A1 | 8/2019 | Stach et al. | |
| 2019/0310868 A1 | 10/2019 | Vaindiner | |
| 2019/0317803 A1 | 10/2019 | Maheshwari | |
| 2019/0324781 A1 | 10/2019 | Ramamurthy | |
| 2019/0332508 A1* | 10/2019 | Goyal | G06F 11/3414 |
| 2019/0340240 A1 | 11/2019 | Duta | |
| 2019/0354720 A1 | 11/2019 | Tucker | |
| 2019/0377987 A1 | 12/2019 | Price et al. | |
| 2020/0019767 A1 | 1/2020 | Porter et al. | |
| 2020/0034976 A1 | 1/2020 | Stone et al. | |
| 2020/0058387 A1 | 2/2020 | Stahel | |
| 2020/0059441 A1 | 2/2020 | Viet | |
| 2020/0065384 A1 | 2/2020 | Costello | |
| 2020/0074070 A1 | 3/2020 | Boodaei | |
| 2020/0097742 A1 | 3/2020 | Kumar et al. | |
| 2020/0104350 A1 | 4/2020 | Allen | |
| 2020/0125635 A1 | 4/2020 | Nuolf | |
| 2020/0147791 A1 | 5/2020 | Safary | |
| 2020/0151444 A1 | 5/2020 | Price et al. | |
| 2020/0151591 A1 | 5/2020 | Li | |
| 2020/0159647 A1 | 5/2020 | Puszkiewicz | |
| 2020/0159648 A1 | 5/2020 | Ghare | |
| 2020/0249964 A1 | 8/2020 | Fernandes | |
| 2020/0257764 A1 | 8/2020 | Reisswig | |
| 2020/0273078 A1 | 8/2020 | Xu | |
| 2020/0285353 A1 | 9/2020 | Rezazadeh Sereshkeh | |
| 2020/0311210 A1 | 10/2020 | Nama | |
| 2020/0334249 A1 | 10/2020 | Canim | |
| 2020/0342032 A1* | 10/2020 | Subramaniam | G06N 3/006 |
| 2020/0364291 A1 | 11/2020 | Bentabet | |
| 2020/0410082 A1 | 12/2020 | Sharieh | |
| 2021/0019157 A1 | 1/2021 | Voicu | |
| 2021/0042516 A1 | 2/2021 | Panakkal | |
| 2021/0049128 A1 | 2/2021 | Kernick | |
| 2021/0067492 A1 | 3/2021 | Mastracci | |
| 2021/0073326 A1 | 3/2021 | Aggarwal | |
| 2021/0107140 A1 | 4/2021 | Singh | |
| 2021/0117742 A1 | 4/2021 | Gligan | |
| 2021/0141497 A1 | 5/2021 | Magureanu | |
| 2021/0216334 A1 | 7/2021 | Barrett | |
| 2021/0248153 A1 | 8/2021 | Sirangimoorthy | |
| 2021/0271985 A1 | 9/2021 | Biohm | |
| 2021/0279166 A1 | 9/2021 | Peng | |
| 2021/0288823 A1 | 9/2021 | Foth | |
| 2021/0333983 A1 | 10/2021 | Singh | |
| 2021/0366099 A1 | 11/2021 | Liao | |
| 2021/0391004 A1 | 12/2021 | Yudanov | |
| 2022/0032471 A1* | 2/2022 | Singh | G06F 3/0484 |
| 2022/0038445 A1 | 2/2022 | LeClair | |
| 2022/0138309 A1 | 5/2022 | Barnett | |
| 2022/0197255 A1 | 6/2022 | Cella | |
| 2022/0245936 A1 | 8/2022 | Valk | |
| 2022/0318224 A1 | 10/2022 | Thompson | |
| 2022/0326974 A1 | 10/2022 | Bond | |
| 2022/0335240 A1 | 10/2022 | Smock | |
| 2022/0405094 A1 | 12/2022 | Farquhar | |
| 2022/0405503 A1 | 12/2022 | Kaza | |
| 2022/0413997 A1 | 12/2022 | Shi | |
| 2023/0052190 A1 | 2/2023 | Goyal et al. | |
| 2023/0053260 A1 | 2/2023 | Goyal et al. | |
| 2023/0083893 A1 | 3/2023 | Craft | |
| 2023/0132894 A1* | 5/2023 | Iwasaki | H04L 51/046<br>709/206 |
| 2023/0143922 A1* | 5/2023 | Cosareanu | G06F 9/451<br>718/107 |
| 2023/0214239 A1 | 7/2023 | Singh | |
| 2023/0283604 A1 | 9/2023 | Griffin | |
| 2023/0419711 A1 | 12/2023 | Ramnath | |
| 2024/0004851 A1 | 1/2024 | Zhang | |
| 2024/0056479 A1 | 2/2024 | Senecal | |

(56) References Cited

U.S. PATENT DOCUMENTS

2024/0281474 A1 8/2024 Craft
2025/0110810 A1 4/2025 Gajera

FOREIGN PATENT DOCUMENTS

WO 2019/092672 A2 5/2019
WO 2022/076488 4/2022

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center. Bergen et al., RPC automation: making legacy code releant, May 2013, 6 pages.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages. Yu et al., Deplying and managing Web services: issues, solutions, and directions, 36 pages (Year: 2008).

Yu et al. Deplying and managing Web services: issues, solutions, and directions, 36 pages (Year: 2008).

Zhifang et al., Test automation on moble device, May 2010, 7 pages.

Non-Final Office Action for U.S. Appl. No. 17/230,492, mailed Oct. 14, 2022.

Notice of Allowance for U.S. Appl. No. 16/398,532, mailed Oct. 23, 2022.

Non-Final Office Action for U.S. Appl. No. 16/876,530, mailed Sep. 29, 2020.

Final Office Action for U.S. Appl. No. 16/876,530, mailed Apr. 13, 2021.

Notice of Allowance for U.S. Appl. No. 16/876,530, mailed Jul. 22, 2021.

Dai, Jifeng et al., "R-fcn: Object detectiom via region-based fully convolutional networks", Advances in neural information processing systems 29 (2016). (Year: 2016).

Ren, Shaoqing et al., "Faster r-cnn: Towards realOtime object detection with region proposal network." Advances in neutral information processing systems 28 (2015).

International Search Report for PCT/US2021/053669, dated May 11, 2022.

Embley et al., "Table-processing paradigms: a research survey", International Journal on Document Analysis and Recognition, vol. 8, No. 2-3, May 9, 2006, pp. 66-86.

Non-Final Office Action for U.S. Appl. No. 16/925,956, mailed Sep. 16, 2021.

Notice of Allowance for U.S. Appl. No. 16/925,956, mailed Jan. 7, 2022.

Pre-Interview Office Action for U.S. Appl. No. 16/398,532, mailed Jul. 8, 2022.

Notice of Allowance for U.S. Appl. No. 16/398,532, mailed Oct. 13, 2022.

Non-Final Office Action for U.S. Appl. No. 17/139,838, mailed Feb. 22, 2022.

Final Office Action for U.S. Appl. No. 17/139,838, mailed Nov. 15, 2022.

Notice of Allowance for U.S. Appl. No. 17/139,838, mailed Apr. 5, 2023.

International Search Report and Written Opinion for PCT/US2021/015691, mailed May 11, 2021.

A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). Ami Press. pp. 226-231 (1996).

Deep Residual Learning for Image Recognition, by K. He, X. Zhang, S. Ren, and J. Sun, arXiv: 1512.03385 (2015).

FaceNet: A Unified Embedding for Face Recognition and Clustering, by F. Schroff, D. Kalenichenko, J. Philbin, arXiv:1503.03832 (2015).

Luqman, et al. "Fuzzy multilevel graph embedding", copyright 2012 Elsevier Ltd.

Sharma et al. Determining similarity in histological images using graph-theoretic description and matching methods for content-based image retrieval in medical diagnostics, Biomed Center, copyright 2012.

First Action Interview Pilot Program Pre-Interview communication for U.S. Appl. No. 16/779,462, mailed Dec. 3, 2021.

Reply under 37 CDT 1.111 to Pre-Interview Communication for U.S. Appl. No. 16/779,462, filed Jan. 25, 2022.

Notice of Allowance for U.S. Appl. No. 16/731,044 mailed Feb. 9, 2022.

Notice of Allowance for U.S. Appl. No. 16/731,044, mailed Jun. 22, 2023.

Non-Final Office Action for U.S. Appl. No. 16/731,044, mailed Jan. 25, 2021.

Notice of Allowance for U.S. Appl. No. 16/731,044, mailed May 5, 2021.

Non-Final Office Action for U.S. Appl. No. 18/126,935, mailed Jul. 13, 2023.

Non-Final Office Action for U.S. Appl. No. 17/139,842, mailed Jul. 18, 2023.

Notice of Allowance for U.S. Appl. No. 17/588,588, mailed Aug. 2, 2023.

Pre-Interview Office Action for U.S. Appl. No. 16/859,488, mailed Jan. 25, 2021.

First Action Interview for U.S. Appl. No. 16/859,488, mailed Mar. 22, 2021.

Final Office Action for U.S. Appl. No. 16/859,488, mailed Jul. 8, 2021.

Notice of Allowance for U.S. Appl. No. 16/859,488, mailed Mar. 30, 2022.

Final Office Action for U.S. Appl. No. 17/463,494, mailed Sep. 6, 2023.

Final Office Action for U.S. Appl. No. 17/160,080, mailed Sep. 11, 2023.

Final Office Action for U.S. Appl. No. 17/534,443, mailed Sep. 11, 2023.

Final Office Action for U.S. Appl. No. 16/930,247 mailed Oct. 12, 2023.

Notice of Allowance for U.S. Appl. No. 17/534,443 mailed Oct. 24, 2023.

Notice of Allowance for U.S. Appl. No. 18/126,935, mailed Jan. 10, 2024.

Notice of Allowance for U.S. Appl. No. 18/215,126, mailed Jan. 25, 2024.

Advisory Action and After Final Pilot Decision for U.S. Appl. No. 17/160,080, mailed Jan. 29, 2024.

Non-Final Office Action for U.S. Appl. No. 17/160,082, mailed Feb. 15, 2024.

Final Office Action for U.S. Appl. No. 17/206,029, mailed Feb. 28, 2024.

Non-Final Office Action for U.S. Appl. No. 17/160,080, mailed Mar. 13, 2024.

Non-Final Office Action for U.S. Appl. No. 17/160,084, mailed Mar. 15, 2024.

Non-Final Office Action for U.S. Appl. No. 18/094,305, mailed May 9, 2024.

Final Office Action for U.S. Appl. No. 17/160,084, mailed May 16, 2024.

Non-Final Office Action for U.S. Appl. No. 18/218,009, mailed May 20, 2024.

(56) References Cited

OTHER PUBLICATIONS

Final Office Action for U.S. Appl. No. 17/160,080, mailed Jun. 12, 2024.
Notice of Allowance for U.S. Appl. No. 17/389,300, mailed Jun. 27, 2024.
Non-Final Office Action for U.S. Appl. No. 17/160,082, mailed Jul. 24, 2024.
Final Office Action for U.S. Appl. No. 18/094,305, mailed Jul. 29, 2024.
Notice of Allowance for U.S. Appl. No. 16/458,138, mailed Sep. 16, 2024.
Notice of Allowance for U.S. Appl. No. 17/160,082, mailed Sep. 18, 2024.
Notice of Allowance for U.S. Appl. No. 17/537,466, mailed Sep. 25, 2024.
Non-Final Office Action for U.S. Appl. No. 17/988,660, mailed Sep. 25, 2024.
Non-Final Office Action for U.S. Appl. No. 17/160,080, mailed Oct. 16, 2024.
Notice of Allowance for U.S. Appl. No. 18/218,009, mailed Oct. 23, 2024.
Final Office Action for U.S. Appl. No. 18/103,331, mailed Nov. 1, 2024.
Non-Final Office Action for U.S. Appl. No. 16/398,532, mailed Nov. 15, 2024.
Notice of Allowance for U.S. Appl. No. 18/218,009, mailed Nov. 19, 2024.
Non-Final Office Action for U.S. Appl. No. 17/160,084, mailed Dec. 18, 2024.
Non-Final Office Action for U.S. Appl. No. 17/139,842, mailed Dec. 19, 2024.
Non-Final Office Action for U.S. Appl. No. 17/537,468, mailed Jan. 3, 2025.
Final Office Action for U.S. Appl. No. 17/988,660, mailed Jan. 15, 2025.
Notice of Allowance for U.S. Appl. No. 17/988,660, mailed Feb. 26, 2025.
Non-Final Office Action for U.S. Appl. No. 18/082,567 mailed Mar. 22, 2025.
Final Office Action for U.S. Appl. No. 17/557,741 mailed Mar. 27, 2025.
Final Office Action for U.S. Appl. No. 17/160,080 mailed Apr. 7, 2025.
Final Office Action for U.S. Appl. No. 17/160,084 mailed Apr. 23, 2025.
Final Office Action for U.S. Appl. No. 17/537,468, mailed Jun. 11, 2025.
Notice of Allowance for U.S. Appl. No. 17/139,842, mailed Jun. 17, 2025.
Non-Final Office Action for U.S. Appl. No. 18/377,806, mailed Jul. 31, 2025.
Non-Final Office Action for U.S. Appl. No. 17/828,021, mailed Sep. 4, 2025.
Non-Final Office Action for U.S. Appl. No. 18/381,042, mailed Sep. 24, 2025.
Non-Final Office Action for U.S. Appl. No. 18/610,257 mailed Oct. 8, 2025.

* cited by examiner

250

| **Bot Table** |
| --- |
| Bot Name |
| Bot Description |
| Bot GUID |
| Group (Factory) |
| Documentation Path |
| Automation Platform |
| Owner Name |
| Owner Email |
| Skill (collection)<br>• Skill Name<br>• SkillGUID<br>• Skill Hourly Rate<br>• Skill Human Equivalent Time |
| Dependent Application (array)<br>• Application A<br>• Application B |
| Bot Status (On/Off) |
| Admin Status (On/Off) |
| Factory Status |
| Last Updated Date/Time |
| Last Updated By (user ID) |
| Registration ID |
| Archived (True/False) |
| Version |
| |

FIG. 2C

262

| **Exemplary Bot Table** |
| --- |
| Letter Generation Bot |
| Generation of letters for customer financial transactions |
| BOTDHKE764dGK23 |
| GROUPDGUD89320HKA |
| \Documentation\Finance\BOTDHKE764dGK23.pdf |
| Automation Anywhere |
| Micah Smith |
| msmith@aa.com |
| Skill (collection)<br>• Letter Generation<br>• SKILL194FKSBN%$<br>• 51.75<br>• 15 |
| Dependent Application (array)<br>• Microsoft Word<br>• Outlook |
| ON |
| ON |
| ON |
| 2/13/2022 14:40:00 |
| msmith@aa.com |
| 1059284 |
| False |
| 1.0.0.1 |
| |

FIG. 2D

270

| **Group (Factory) Table** |
| --- |
| Group Name |
| Group Description |
| Group GUID |
| Group Email |
| Group Approved |
| Last Modified Date/Time |
| Last Modified By |
| Entitlements (collection)<br>• Entitlement Name<br>• Entitlement Description<br>• Entitlement GUID<br>• Provisions<br>[provision data] |
| |

FIG. 2E

272

| **Exemplary Group (Factory) Table** |
| --- |
| Finance |
| Finance Automation Team |
| GROUPDGKRKD7803VJDK |
| FinanceTeam@aa.com |
| True |
| 2/13/2022 15:32:00 |
| msmith@aa.com |
| Entitlements (collection)<br>[First Entitlement]<br>• Group Owner<br>• Entitlements for group owners<br>• ENTITLEMENT823FHAHENDK<br>• Provisions<br>Read: True<br>Write: True<br>Modify: True<br>Delete: True<br><br>[Second Entitlement]<br>• Developer<br>• Entitlements for developers<br>• ENTITLEMENT935FHAHELMD<br>• Provisions<br>Read: True<br>Write: True<br>Modify: True<br>Delete: True<br>Approve: False<br><br>[Third Entitlement]<br>• Business User<br>• Entitlements for business users<br>• ENTITLEMENT867FHAHEUED<br>• Provisions<br>Read: True<br>Write: False<br>Modify: False<br>Delete: False<br>Approve: False |
| |

FIG. 2F

280

| **Milestone Table** |
|---|
| Bot GUID |
| Bot Result (Success or Failure) |
| Bot Start Time |
| Bot End Time |
| Bot Successful Task Count |
| Bot Failed Task Count |
| Milestone GUID |
| Bot Skill |
| Bot User Account |
| Bot Workstation |
| Payload |
| [optional payload data] |
| |

FIG. 2G

282

| **Exemplary Milestone Table** |
|---|
| MSTNFGIS4204MFNDS |
| Success |
| 2/13/2022 17:00:00 |
| 2/13/2022 17:21:00 |
| 5 |
| 0 |
| TRANS0349582FKSC245D |
| Letter Generation |
| LetterBt1 |
| AA-AWS15C3 |
| Payload |
| Letter 1 – letter details |
| Letter 2 – letter details |
| Letter 3 – letter details |
| |

FIG. 2H

CENTRALIZED MILESTONE RECORDATION FOR ROBOTIC PROCESS AUTOMATION SYSTEMS

CROSS-REFERENCE TO RELATED APPLICATION

This application claims priority to U.S. Provisional Patent Application No. 63/442,104, filed Jan. 30, 2023, and entitled "CENTRALIZED MILESTONE RECORDATION FOR ROBOTIC PROCESS AUTOMATION SYSTEMS," which is hereby incorporated by reference herein.

BACKGROUND OF THE INVENTION

Robotic process automation (RPA) systems enable automation of repetitive and manually intensive computer-based tasks. In an RPA system, computer software, namely a software robot (often referred to as a "bot"), may mimic the actions of a person in order to perform various computer-based tasks. For instance, an RPA system can interact with one or more software applications through user interfaces, as a person would do. Therefore, RPA systems typically do not need to be integrated with existing software applications at a programming level, thereby eliminating the difficulties inherent to integration. Advantageously, RPA systems permit automation of application level repetitive tasks via software robots that are coded to repeatedly and accurately perform the repetitive tasks.

Unfortunately, however, execution of software robots sometime fail because resources used by the software robots are unavailable when the software robots are executing. The needed resources can, for example, be application programs, databases, cloud storage, etc. During execution of a software robot, if a needed resource is not available to the software robot, then the execution of the software robot normally fails. Additionally, performance, reliability and cost savings associated with utilization of software robots are not well tracked or evaluated.

Therefore, there is a need for improved approaches to execute and monitor software robots, such that software robots can execute more reliably and RPA systems can better understand performance and benefits of software robots.

SUMMARY

Improved management and/or monitoring of software robots for RPA systems is disclosed. One aspect of certain embodiments can support milestone recordation after a software robot completes its execution. The milestone being recorded can denote that the corresponding software robot has executed and its execution status. The milestone being recorded can include or be linked to additional corresponding data that allows for greater performance and/or value monitoring for the corresponding software robot. As an example, the additional corresponding data for the milestone can denote one or more of: tasks completed, skills utilized, estimated value or savings. Another aspect of certain embodiments can provide cross-platform execution management of software robots by utilizing an automation management server to receive and respond to automation requests to execute a software robot. An automation request can request permission to execute a particular software robot. The automation management server can interact with a status database to obtain status data that is used to determine whether the software robot should be given permission to execute, while taking into consideration administrative requirements and/or dependent resources utilized by the software robot.

The invention can be implemented in numerous ways, including as a method, system, device, or apparatus (including computer readable medium and graphical user interface). Several embodiments of the invention are discussed below.

As a method for providing a repository of milestone data for software robots that have executed, one embodiment can, for example, include at least: identifying a software robot that has concluded its execution, the software robot being identified by a software robot (SR) identifier; obtaining milestone data associated with the identified software robot that has concluded its execution; requesting, via a request to a milestone recordation service, recordation of a milestone, the milestone being associated with the execution that has concluded for the identified software robot; subsequently receiving a response from the milestone recordation service; parsing the response from the milestone service to obtain at least a milestone identifier, the milestone identifier identifying the milestone that has been recorded by the milestone recordation service and assigned the milestone identifier; and storing the milestone identifier for subsequent retrieval of the milestone using the milestone identifier.

As a computer-implemented method for managing recordation of milestones concerning execution of software robots, one embodiment can, for example, include at least: receiving, at a milestone management server, a milestone recordation request pertaining to a software robot that has at least partially executed; parsing the milestone recordation request to retrieve at least milestone data; generating a milestone identifier; forming a milestone data record including the milestone identifier and the milestone data; and storing the milestone data record to a milestone database.

As an automation management system for software robots, one embodiment can, for example, include at least: a milestone database configured to store milestones concerning a plurality of software robots; and a milestone management server operatively coupled to the milestone database. The milestone management server is configured to at least: receive a milestone recordation request pertaining to a software robot that has at least partially executed; parse the milestone recordation request to retrieve at least milestone data; generate a milestone identifier; form a milestone data record including the milestone identifier and the milestone data; and store the milestone data record to the milestone database.

As a non-transitory computer readable medium including at least computer program code tangible stored thereon for managing recordation of milestones concerning execution of software robots, one embodiment can, for example, include at least: computer program code for receiving, at a milestone management server, a milestone recordation request pertaining to a software robot that has at least partially executed; computer program code for parsing the milestone recordation request to retrieve at least milestone data; computer program code for generating a milestone identifier; computer program code for forming a milestone data record including the milestone identifier and the milestone data; and computer program code for storing the milestone data record to a milestone database.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which:

FIG. 2C illustrates a software robot table according to one embodiment.

FIG. 2D illustrates an exemplary software robot table according to one embodiment.

FIG. 2E illustrates a group table according to one embodiment.

FIG. 2F illustrates an exemplary group table according to one embodiment.

FIG. 2G illustrates a milestone table according to one embodiment.

FIG. 2H illustrates an exemplary milestone table according to one embodiment.

DETAILED DESCRIPTION OF CERTAIN EMBODIMENTS

Figure 1:
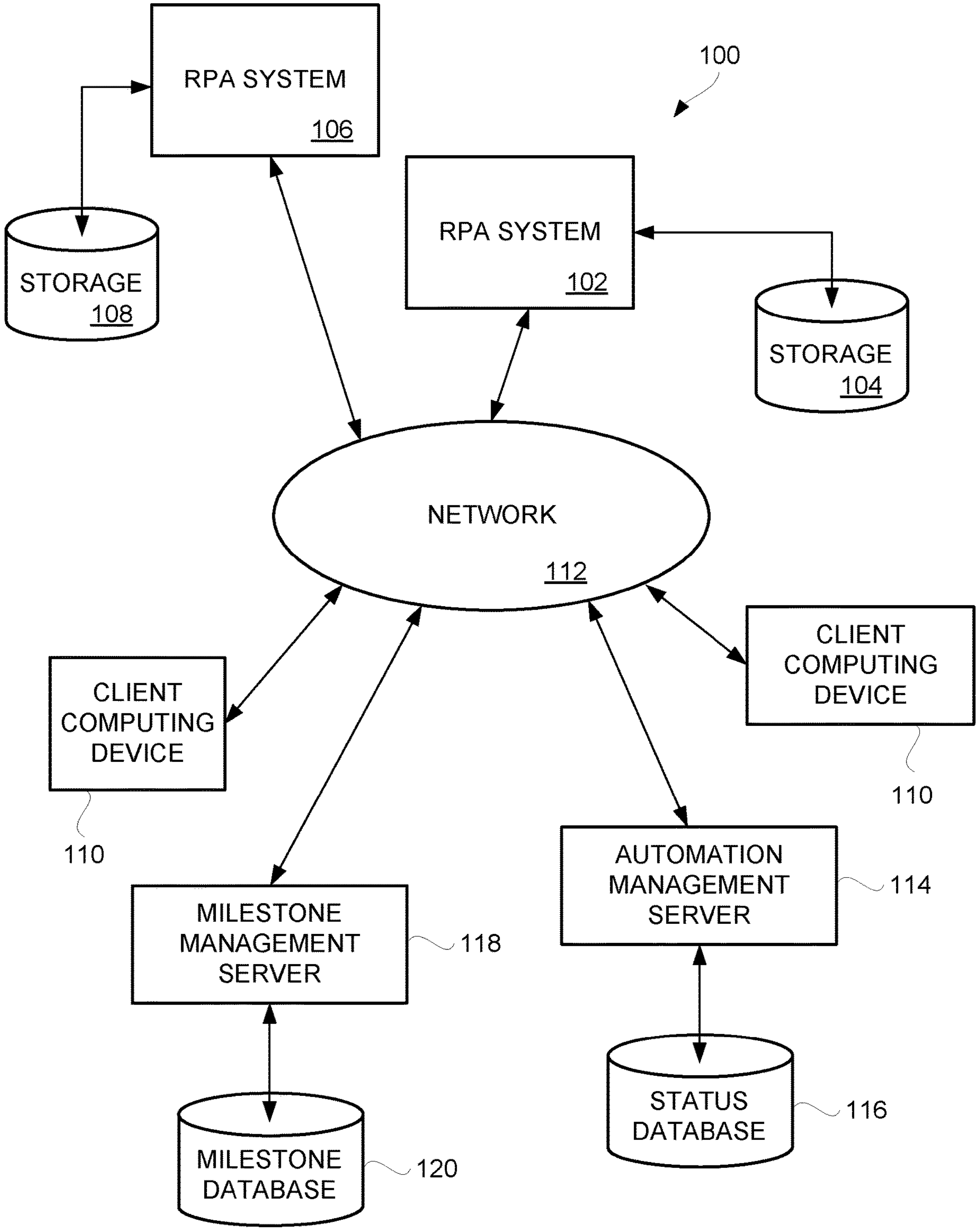
FIG. 1 is a block diagram of an RPA computing environment according to one embodiment.

Various embodiments providing management of software robots for RPA systems are disclosed. One aspect of certain embodiments can support milestone recordation after a software robot completes its execution. The milestone being recorded can denote that the corresponding software robot has executed and its execution status. The milestone being recorded can include or be linked to additional corresponding data that allows for greater performance and/or value monitoring for the corresponding software robot. The additional corresponding data for the milestone can denote one or more of: tasks completed, skills utilized, estimated value or savings. In one or more embodiments, the milestones can be recorded in a centralized manner (e.g., cloud storage) and available for cross-platform utilization. Moreover, if milestones are configured to denote skills, tasks, and/or value data, then performance or value (e.g., cost savings) of the software robot can be consistently quantified.

Another aspect of certain embodiments can provide cross-platform execution management of software robots by utilizing an automation management server to receive and respond to automation requests to execute a software robot. An automation request can be a request for permission to execute a particular software robot. The automation management server can interact with a status database to obtain status data that is used to determine whether the software robot should be given permission to execute, while taking into consideration administrative requirements and/or dependent resources utilized by the software robot. The execution management provided by the various embodiments can provide better control and utilization of software robots. Advantageously, software robots can be executed in instances when their resources required for execution are known to be available, thus improving efficiency and performance.

Generally speaking, RPA systems use computer software to emulate and integrate the actions of a person interacting within digital systems. In an enterprise environment, RPA systems are often designed to execute a business process. In some cases, RPA systems use artificial intelligence (AI) and/or other machine learning capabilities to handle high-volume, repeatable tasks that previously required humans to perform. RPA systems also provide for creation, configuration, management, execution, and/or monitoring of software automation programs.

A software automation program can be referred to as a software robot, software agent, or a bot. A software automation program can interpret and execute tasks on one's behalf. Software automation programs are particularly well suited for handling a lot of the repetitive tasks that people perform every day. Software automation programs can accurately perform a task or workflow they are tasked with over and over. As one example, a software automation program can locate and read data in a document, email, file, or window. As another example, a software automation program can connect with one or more Enterprise Resource Planning (ERP), Customer Relations Management (CRM), core banking, and other business systems to distribute data where it needs to be in whatever format is necessary. As another example, a software automation program can perform data tasks, such as reformatting, extracting, balancing, error checking, moving, copying, or any other desired tasks. As another example, a software automation program can retrieve, modify or add data desired from a webpage, application, screen, file, or other data source. As still another example, a software automation program can be triggered based on time or an event, and can serve to take files or data sets and move them to another location, whether it is to a customer, vendor, application, department or storage. These various capabilities can also be used in any combination. As an example of an integrated software automation program making use of various capabilities, the software automation program could start a task or workflow based on a trigger, such as a file being uploaded to an FTP system. The integrated software automation program could then download that file, scrape relevant data from it, upload the relevant data to a database, and then send an email to a recipient to inform the recipient that the data has been successfully processed.

Embodiments of various aspects of the invention are discussed below with reference to FIGS. 1-12. However, those skilled in the art will readily appreciate that the detailed description given herein with respect to these figures is for explanatory purposes as the invention extends beyond these limited embodiments.

FIG. 1 is a block diagram of an RPA computing environment 100 according to one embodiment. In general, the RPA computing environment 100 can support one or more RPA systems. These one or more RPA systems can operate on a common platform or on different platforms. For example, different RPA system providers typically have different platforms which are incompatible. Some examples of RPA system providers include Automation Anywhere, UiPath, Blue Prism. Kofax, Pega, Microsoft, NICE, and Rocketbot.

The RPA computing environment 100 includes a first RPA system 102. The first RPA system 102 can be coupled to a storage 104 for storage of software automation programs. The RPA computing environment 100 can also include a second RPA system 106. The second RPA system 106 can be coupled to a storage 108 for storage of software automation programs. The RPA systems 102, 106 support and facilitate execution of a plurality of different software automation programs. These software automation programs can be referred to as "software robots," "bots" or "software bots." The RPA computing environment 100 can concurrently support numerous software robots, such as more than one hundred different software robots, or even more than one thousand different software robots.

The platform used by the first RPA system 102 can be the same as the platform used by the second RPA system 102, or the platform used by the first RPA system 102 can be different than the platform used by the second RPA system 102.

Additionally, the RPA computing environment 100 can support various different types of computing devices that can interact with the first RPA system 102 and/or the second RPA system 106. These computing devices can be referred to as client computing devices. The RPA computing environment 100 includes one or more client computing devices 110. Each of the client computing devices 110 can, for example, be an electronic device having computing capabilities, such as a mobile phone (e.g., smart phone), tablet computer, desktop computer, portable computer, server computer, and the like.

The RPA environment 100 can also include a network 112 made up of one or more wired or wireless networks that serve to electronically interconnect various computing devices, systems or servers for data transfer. As shown in FIG. 1, the RPA computing environment 100 permits the RPA systems 102, 106 as well as the client computing devices 110 to couple to the network 112 and thereby allow for interaction between such systems and devices via the network 112.

To facilitate centralized management of automation processes, the RPA environment 100 can include an automation management server 114. The automation management server 114 can manage execution of software automation programs (e.g., "software robots" or "bots"). By supporting different platforms, the automation management server 114 can support or service numerous software robots, such as more than one hundred different software robots. The automation management server 114 can be assisted by a status database 116. The status database 116 can store information about numerous software automation programs, such as which resources the corresponding software automation programs are reliant on during execution. For example, the automation management server 114 can prevent a particular software automation program from being executed if its needed resources are not then available. In doing so, the automation management server 114 can access the status database 116 to retrieve status data pertaining to those resources that the corresponding software automation program is reliant on during execution. The needed resources can vary with implementation and can vary with different software automation programs. As an example, the needed resources can include one or more of: (i) dependent services or applications (e.g., an accessible database, a network accessible server, an operational application program, Application Programming Interfaces (APIs), and (ii) the like); one or more approvals (e.g., administrative approvals, even multiple levels thereof); and/or (iii) completed registration, documentation and/or testing.

The automation management server 114 can also consider whether the software automation program to be executed has any administrative approvals that are required. The status database 116 can store information about administrative status of the numerous software automation programs. For example, the automation management server 114 can prevent a particular software automation program from being executed if needed administrative approvals have not been acquired. The needed administrative approvals can vary with implementation. As examples, the needed administrative approvals can include one or more of: automation leader approval, security review, code review, proof of documentation, or an on/off status (which could be manually set via a web interface).

In one embodiment, the status data can pertain to a consolidated status flag, such as a Yes/No flag that denotes a multi-conditional result from a plurality of conditions. The consolidated status flag can be stored in a status database. In one implementation, the multi-conditional result can consider one or more conditions, such as one or more of: (i) Software Robot (SR) Identifier approved (e.g., registered with automation management system); (ii) software robot administrative approval; and (iii) group identifier being valid (e.g., software robot registered with an existing group). In other implementations, the one or more conditions can additionally or alternatively include one or more of: (i) group owner approved: (ii) proof of documentation; and (iii) software robot registered in status database. The status data can pertain to the one or more conditions, the consolidated status flag, or both or some combination thereof. The status data can be stored in a status database. The status database can store and maintain up-to-date status data, such that the status remains current.

In one embodiment, the status data can also include data concerning dependent resources. For example, if the software robot, during execution, interacts with one or more application programs or other resources, then the availability of these dependent resources can be considered in determining whether the software robot is permitted to execute. If one or more dependent resources are not available, then the software robot should not be given permission to execute. In such case, the status data can include consideration of the availability of dependent resources.

In another embodiment, the data concerning dependent resources can be considered separate from the status data. For example, if the software robot, during execution, interacts with one or more application programs or other resources, then the availability of these dependent resources can be considered in determining whether the software robot is permitted to execute. If one or more dependent resources are not available, then the software robot should not be given permission to execute.

In one embodiment, the conditions to be considered in determining or setting status data can be configurable. For example, in registering a software robot, a user interface can enable a user to select or identify those conditions to be considered in determining status data for the software robot.

Further, to facilitate centralized reporting, the RPA environment 100 can include a milestone management server 118. The milestone management server 118 can manage the storage and retrieved of milestone data. Milestone data is data pertaining to execution of software automation programs. Milestone data can facilitate reporting of successes or savings associated with a particular software automation program. Milestone data can facilitate comparative evaluation of performance, successes or savings associated with multiple software automation programs. With the centralized reporting, the milestone management server 118 is able to operate across various RPA platforms. Hence, reporting or evaluating successes or savings can be across different RPA platforms, if desired. For example, successes can be task(s) completed by the particular software automation program. As an example, savings can be an amount of time (e.g., hours) of value (e.g., money) saved by automation of otherwise manually performed work.

Also, in one implementation, savings yielded by a software robot can be quantified. For example, savings yielded by execution of a given software robot can be quantified by an amount of time (e.g., hours) saved by automation of otherwise manually performed work, such as amount of time per task completed by the software robot. The amount of time saved can also be converted into a monetary value (e.g., money) saved by multiplying the amount of time saved multiplied by an hourly rate for the associated task or skill related thereto.

In one embodiment, saving yielded by a software automation program can be computed by a unit of work performed by a software automation program. For example, the unit of work can be considered a task. As noted above, one or more tasks can be associated with a software automation program. A task, as well as a value for the completion of the task, can also be known or denoted in the milestone data for a given milestone. For a given milestone, a number of times the task has been performed by the software automation program can be stored in the milestone data. In an implementation noted below, the number of times a task is performed during an execution of a software automation program can be referred to as a successful task count and can be stored in a milestone. The task can be associated with a skill undertaken by the task. The skill or task can have an associated value. The value for the completion of each task is the value for the skill or task. Often, a software automation program can perform more than one task in a given execution, in which case the value for the completion of the execution of the software automation is the sum of the values for each of the tasks being completed. Different tasks can use different skills and have different values. A software automation program may be designed to perform multiple tasks in order to complete a personal or business-related process. Each of the various tasks can be said to be of a specific skill type. For example, in order to complete a business process of on-boarding new employees, a software automation program may need to perform tasks of various skill types such as, but not limited to, letter generation, email composition, spreadsheet updating, and database updating. Said in another way, software automation programs can have one or more skills, skill types, or they can have various skill sets.

The techniques described within this application allow for the tracking and measurement of software automation program execution success or failure at various levels. A first level of measurement measures the success or failure of a software automation program in terms of its ability to complete its objective or goal. Another level of measurement measures how many of the individual tasks that the software automation program is designed to perform were successfully completed. Yet another level of measurement measures how many tasks of each skill type were successfully completed. The techniques described herein allow for performance measurements of software automation program executions at multiple levels, more granular levels, and according to various metrics that give automation designers and engineers additional insight regarding the effectiveness of software automation programs.

In some implementations, each skill type may be assigned an associated measure of value. An example measure of value is resources saved per time, where resources can be money (e.g., US dollars, Indian Rupees, etc.), energy, man hours, compute time, green house cases, etc. In some settings, a skill type can be assigned a value of US dollars saved per hour that a human worker need not devote to specific task given a software automation program will complete the task for the human worker. For example, if a software automation program is designed to generate letters, it may have multiple skills, each of which allow it to perform different types of letter generation tasks. Such a software automation program is capable of generating letters for different teams within a company, e.g.:

(i) It can generate a human resource department related welcome letter for a new employee that would otherwise take a human worker twenty (20) minutes to generate. This skill may be assigned a measure of value of $40 USD per hour since an average human worker would otherwise be paid that amount.

(ii) It can generate a finance department related letter regarding proof of assets that would otherwise take a human worker, e.g., a financial consultant, thirty (30) minutes to generate. This skill may be assigned a measure of value of $100 USD per hour since an average human worker would otherwise be paid that amount.

In the above example, the skills represent the different types of work that the software automation program can perform, and the hourly rate/time associated with the human equivalent work. So even though the bot in this case can perform multiple tasks, the type of tasks that it is performing creates respective amounts of value.

The performance of software automation programs can be measured and/or ranked based on skill types and the associated measures of value. As previously mentioned, this allows automation designers and engineers additional insight regarding the effectiveness of software automation programs. In one example, software automation programs may be ranked based on the amount of resources saved or their return on investment.

The RPA system 102, 106 can create, maintain, execute, and/or monitor recordings, including previously established recordings, to carry out software automation programs. The RPA system 102, 106 can support creation and storage of software automation programs. For example, the RPA system 102, 106 can support a recording session in which a series of user interactions with one or more application programs operating on a computing device can be recorded. The series of user interactions can then be utilized by the RPA system 102, 106 to form (i.e., create) a software automation program (e.g., bot) for carrying out such actions in an automated manner. The RPA utilization environment 100 can also store the software automation programs (e.g., bots) that have been created to storage 104, 108.

In addition, the RPA system 102, 106 supports the execution of the one or more software automation programs that have been created by the RPA system 102, 106 or some other RPA system. Execution (or running) of a software automation program at a computing device causes playback of the software automation program.

On execution of one or more of the software automation programs, the software automation programs can interact with one or more software programs. One example of a software program is an application program. Application programs can vary widely with a user's computer system and tasks to be performed thereby. For example, application programs being used might be word processing programs, spreadsheet programs, email programs, ERP programs, CRM programs, web browser programs, any many more. A software program, when operating, typically presents and supports interaction with one or more windows. For example, a user interface presented within the one or more windows can be programmatically interacted with through execution of the one or more software automation programs.

In some cases, the software automation program seeks to access documents that contain data that is to be extracted and then suitably processed. The documents are typically digital images of documents, which might be presented in one or more windows of a software program or accessed via a storage device providing document storage. The RPA system 102, 106 can include processing and structures to support the extraction of data from such document images. Some examples of documents include emails, web pages, forms, invoices, purchase orders, delivery receipts, bill of lading, insurance claims forms, loan application forms, tax forms, payroll reports, etc.

When robotic process automation operations are being performed, the RPA system 102, 106 seeks to interact with one or more software programs. However, since the RPA system 102, 106 is not integrated with the software program, the RPA system 102, 106 often requires an ability to understand what content is contained in a window produced by the software program. For example, the content being presented in a window can pertain to a graphical user interface or a document. In this regard, the RPA system 102, 106 can interact with the software program by interacting with the content in the window. By doing so, the software automation program being carried out can effectively interface with the software program via the window as would a user, even though no user is involved because the actions detailed in the software automation program are programmatically performed. Once the content of the window 108 is captured and understood, the RPA system 102, 106 can perform an action requested by the software automation program by inducing action(s) with respect to the software program.

Figure 2A:
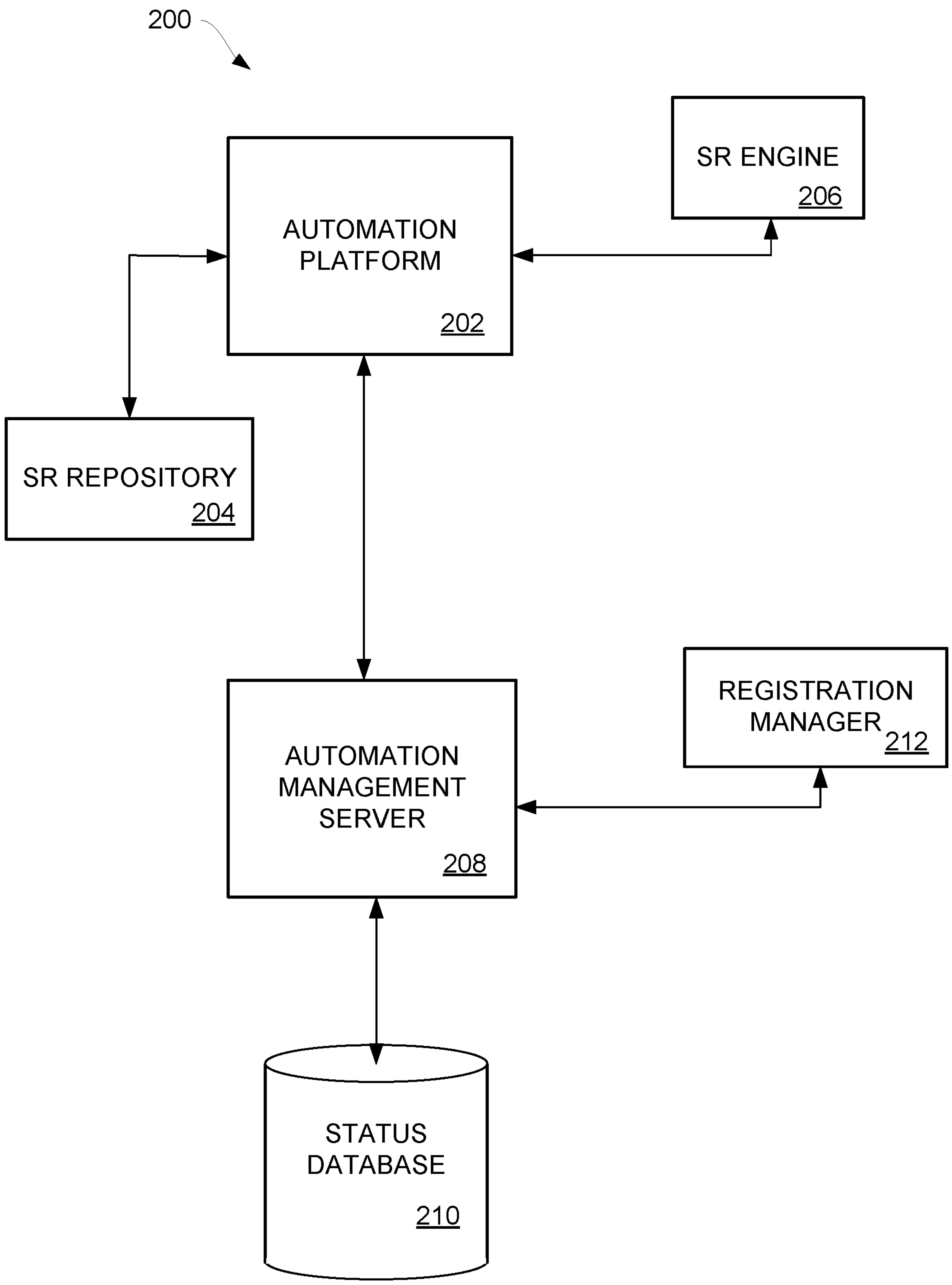
FIG. 2A is a block diagram of an RPA execution management system according to one embodiment.

FIG. 2A is a block diagram of an RPA execution management system 200 according to one embodiment. The RPA execution management system 200 is, for example, an embodiment that is suitable for use in the RPA environment 100 illustrated in FIG. 1. The various components of the RPA execution management system 200 can be directly interconnected, or can be indirectly interconnected such as via one or more networks (e.g., network 112 illustrated in FIG. 1).

The RPA execution management system 200 can include an automation platform 202. In one implementation, the automation platform 202 can be part of an RPA system. The automation platform 202 is a platform that is capable of facilitating execution of software robots. In this regard, the automation platform 202 can execute software robots and/or can provide software robots to client computing devices for execution thereon. The automation platform 202 can couple to a software robot (SR) repository 204. The SR repository 204 can store one or more software robots that are accessible by the automation platform 202. The SR repository 204 can be part of the RPA system or external to the RPA system but accessible thereby. The automation platform 202 can also couple to a SR engine 206, which is able to execute software robots. In one implementation, the SR engine 206 can be resident within the RPA system. In another implementation, the SR engine 206 can be resident within a client computing device.

The RPA execution management system 200 can also include an automation management server 208. The automation management server 208 can operatively connect to the automation platform 202 or to software robots managed by the automation platform 252. Typically, the automation management server 208 is a separate server from an RPA system, such that the automation management server 208 is able to provide services to various different automation platforms or to various software robots therefrom. For example, the automation management server 208 can couple to one or more networks to receive execution requests from software robots (eee, e.g., FIG. 1).

The automation management server 208 can determine whether a software robot is presently able to execute. In doing so, the automation management server 208 can couple to a status database 210. The status database 210 can store status data relevant to execution of software robots. The status data is data that denotes a status of various resources that might be used by software robots that are being executed. The automation management server 208 can access the status data stored in the status database 210 and use a relevant portion of such status data in determining whether a software robot is presently permitted to execute.

In one implementation, the automation management server 208 can operate to monitor resources and/or approvals potentially utilized by computing device(s) in their execution of corresponding software robots. By monitoring such resources, the automation management server 208 can store, to the status database 210, status data concerning resources and/or approvals potentially utilized by computing device(s) in their execution of corresponding software robots. Here, in such an implementation, the automation management server 208 can directly access, monitor or maintain current status data for various resources. The current status data can also be recorded in the status database 210 for subsequent retrieval.

The RPA execution management system 200 can also include a registration manager 212. The registration manager 212 can couple to the automation management server 208. The registration manager 212 can allow software robots to be registered for use with the automation management server 208. A registration process for a software robot can be a computer-implemented process to receive descriptive data and/or dependency data pertaining to the software robot. In one implementation, the registration process can assign a SR identifier for the software robot being registered.

Figure 2B:
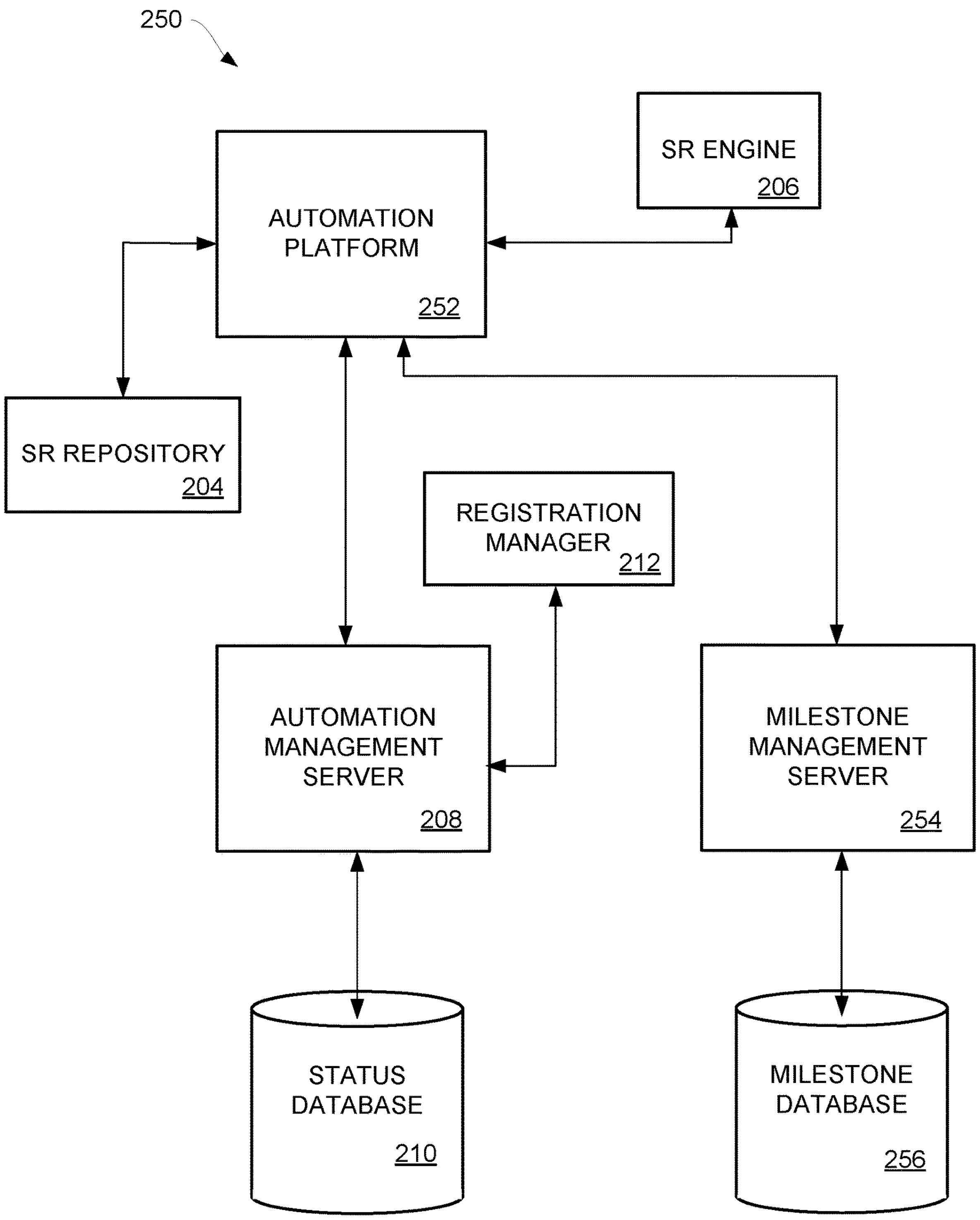
FIG. 2B is a block diagram of an RPA management system according to another embodiment.

FIG. 2B is a block diagram of an RPA management system 250 according to another embodiment. Similar to the RPA execution management system 200 illustrated in FIG.

2A, the RPA management system 250 is, for example, another embodiment that is suitable for use in the RPA environment 100 illustrated in FIG. 1. The various components of the RPA management system 250 can be directly interconnected, or can be indirectly interconnected such as via one or more networks (e.g., network 112 illustrated in FIG. 1).

The RPA management system 250 can include an automation platform 252. In one implementation, the automation platform 252 can be part of an RPA system. The automation platform 252 is a platform that is capable of (i) facilitating execution of software robots and (ii) recordation of milestones. In this regard, the automation platform 252 can execute software robots and/or can provide software robots to client computing devices for execution thereon. The automation platform 252 can couple to a SR repository 204. The SR repository 204 can store one or more software robots that are accessible by the automation platform 252. The SR repository 204 can be part of the RPA system or external to the RPA system but accessible thereby. The automation platform 252 can also couple to a SR engine 206, which is able to execute software robots. In one implementation, the SR engine 206 can be resident within the RPA system. In another implementation, the SR engine 206 can be resident within a client computing device.

The RPA management system 250 can include an automation management server 208. The automation management server 208 can operatively connect to the automation platform 252 or to software robots managed by the automation platform 252. Typically, the automation management server 208 is a separate server from an RPA system, such that the automation management server 208 is able to provide services to various different automation platforms or to various software robots therefrom. For example, the automation management server 208 can couple to one or more networks to receive execution requests from software robots (see, e.g., FIG. 1).

The automation management server 208 can determine whether a software robot is presently able to execute. In doing so, the automation management server 208 can couple to a status database 210. The status database 210 can store status data relevant to execution of software robots. The status data is data that denotes a status of various resources that might be used by software robots that are being executed. The automation management server 208 can access the status data stored in the status database 210 and use a relevant portion of such status data in determining whether a software robot is presently permitted to execute.

In one implementation, the automation management server 208 can operate to monitor resources potentially utilized by computing device(s) in their execution of corresponding software robots. By monitoring such resources, the automation management server 208 can store, to the status database 210, status data concerning resources potentially utilized by computing device(s) in their execution of corresponding software robots. Here, in such an implementation, the automation management server 208 can maintain and access current status data from the status database 210.

The RPA management system 250 can also include a registration manager 212, such as shown in FIG. 2A. The registration manager 212 can couple to the automation management server 208. The registration manager 212 can allow software robots to be registered for use with the automation management server 208. A registration process for a software robot can be a computer-implemented process to receive descriptive data and dependency pertaining to the software robot. In one implementation, the registration process can assign a SR identifier for the software robot being registered.

Still further, the RPA management system 250 can include a milestone management server 254 and a milestone database 256. The milestone management server 254 can operatively connect to the automation platform 252 or to software robots managed by the automation platform 252. Typically, the milestone management server 254 is a separate server from an RPA system, such that the milestone management server 254 is able to provide services to various different automation platforms or to various software robots therefrom. For example, the milestone management server 254 can couple to one or more networks to receive calls from software robots. Although shown separately in FIG. 2B, the milestone management server 254 can be the same or separate server as the automation management server 208. The automation platform 252, or more generally, an RPA system, can access the milestone management server 254 to store or retrieve milestone data to/from the milestone database 256 for a plurality of software robots.

FIG. 2C illustrates a software robot table 260 according to one embodiment. The software robot table 260, also referred to as a bot table, is a table stored in a status database, such as the status database 210 illustrated in FIG. 2A. The software robot table 260 stores data pertaining to a software robot (e.g., bot) in a structured way. The stored data can, for example as shown in FIG. 2C, include one or more of the following data fields: bot name, bot description, bot GUID (i.e., SR identifier), group (e.g., factory), documentation path, automation platform, owner name, owner email, skill(s), dependent application(s), bot status (e.g., On/Off), admin status (e.g., On/Off), factory status, last updated date/time, last updated by (e.g., user ID), registration ID, archived (e.g., true/false), and/or version (e.g., version number). For the skill field, there can be a plurality of sub-fields, including: a skill name, a SkillGUID (i.e., skill identifier), a skill hourly rate, and a skill human equivalent.

More generally, the data fields descriptive of the corresponding software robot can be considered to contain descriptive data. For example, descriptive data concerning the corresponding software robot can be found in one or more of the fields: bot name, bot description, bot GUID, group, documentation path, automation platform, owner name, owner email, last updated date/time, last updated by, registration ID, archived, and/or version. The dependent application(s) field can be considered to contain dependency data. The various status fields (e.g., bot status, admin status, and/or factory status) can contain status data. The skill field and its sub-fields can be considered to contain skill data, which can also be considered a particular type of descriptive data.

FIG. 2D illustrates an exemplary software robot table 262 according to one embodiment. The exemplary software robot table 262, also referred to as an exemplary bot, includes exemplary data for the various data fields of exemplary software robot table 260 shown in FIG. 2C. The exemplary data pertains to letter generation, and of note is that a skill associated with the exemplary bot is described as having a skill name of "Letter Generation", a SkillGUID of "SKILL194FKSBN %$", a skill hourly rate of "51.75" dollars, and a skill human equivalent time of "15" minutes. Additionally, the exemplary data of the exemplary bot notes that the exemplary bot's operation (e.g., execution) is dependent on availability of two different applications (e.g., Microsoft Word and Outlook).

FIG. 2E illustrates a group table 270 according to one embodiment. The group table 270, also referred to as a factory table, is a table that can be stored in a status database, such as the status database 210 illustrated in FIG. 2A. The group is a grouping of one or more users. A group can, for example, be referred to as a team. For example, for a corporate user, there might be a finance team, a human resources team, a sale team, a legal team, etc. A group can, for example, also be referred to as a factory. The group table 270 stores data pertaining to one or more groups in a structured way. The stored data can, for example as shown in FIG. 2E, include one or more of the following data fields: group name, group description, group GUID, group email, group approved, last modified date/time, last updated by (e.g., user ID), and/or one or more entitlements. Each of the one or more entitlements can, for example, include sub-fields of data for entitlement name, entitlement description, entitlement GUID, and provision data. The provision data can, for example, detail access permission for the associated group. As an example, the access permission can be denoted as read, write and/or delete provisions.

FIG. 2F illustrates an exemplary group table 272 according to one embodiment. The exemplary group table 272, also referred to as an exemplary factory table, pertains to a group (e.g., factory) and includes exemplary data for the various data fields of the exemplary group table 270 shown in FIG. 2F. The exemplary data pertains to the group and includes the exemplary data for the various fields. In this particular embodiment, the exemplary data pertains to a group denoted "Finance", with a group description of "Finance Automation Team", a group GUID of "GROUPDGKRKD7803VJDK", and a group email of "msmith@aa.com". The exemplary data also denotes that the group was approved as denoted "True" and was last modified "2/13/2022 15:32:00" by "msmith@aa.com". In this embodiment, the entitlements field is a collection of one or more entitlements. In this particular example, the exemplary group table 272 contains data for three entitlements. For each of the entitlements, the sub-fields of data can denote entitlement name, entitlement description, entitlement GUID, and provision data (e.g., access permission). For the first entitlement, the exemplary data denotes that an entitlement name of "Group Owner", an entitlement description of "Entitlements for group owners", an entitlement GUID of "ENTITLEMENT823FHAHENDK", and provision data of "Read: True", "Write: True", "Modify: True" and "Delete: True". For the second entitlement, the exemplary data denotes that an entitlement name of "Developer", an entitlement description of "Entitlements for developers", an entitlement GUID of "ENTITLEMENT935FHAHELMD", and provision data of "Read: True", "Write: True", "Modify: True", "Delete: True", and "Approve: False". For the third entitlement, the exemplary data denotes that an entitlement name of "Business User", an entitlement description of "Entitlements for business users", an entitlement GUID of "ENTITLEMENT867FHAHEUED", and provision data of "Read: True", "Write: False", "Modify: False", "Delete: False", and "Approve: False".

FIG. 2G illustrates a milestone table 280 according to one embodiment. The milestone table 280 is a table that can be stored in a milestone database, such as the milestone database 256 illustrated in FIG. 2B. The milestone table 280 records data, referred to as milestone data, pertaining to a milestone. A milestone is a summary of an execution of a software robot (e.g., bot). For example, as shown in FIG. 2G, the milestone table 280 stores milestone data that can include one or more of the following data fields: bot GUID (i.e., SR identifier), bot results (e.g., success or failure), bot start time, bot end time, bot successful task count, bot failed task count, milestone GUID, bot skill(s), bot user account, bot workstation, and an optional payload. Hence, for a given execution of a software robot, the effectiveness of the software robot can be detailed in a milestone. The work done by the software robot can be quantified such that a number of tasks performed and/or skills invoked by the software robot can be specified. Additionally, in one implementation, the work done by the software robot can also be quantified into work hours/dollars saved. For example, if the skill/task would have a manual completion cost of x dollars or require a person to spend 1.2 hours on the task/skill, then the value or saving provided by the software robot can be the savings produced, such as 1.2 hours of manual work, which can be converted to a monetary (e.g., dollar) value by multiplication with an associated hourly rate for the skill/task. The payload for the milestone is optional and can be customizable, such that for different software robots different milestone data can be specified so as to be recorded.

FIG. 2H illustrates an exemplary milestone table 282 according to one embodiment. The exemplary milestone table 282 includes exemplary milestone data for the various data fields of the milestone group table 280 shown in FIG. 2G. The exemplary milestone data pertains to execution of a particular software robot.

The exemplary milestone data pertains to a milestone and includes the exemplary data for the various fields. In this particular embodiment, the exemplary milestone data pertains to a milestone from a bot GUID of "MSTNFGIS4204MFNDS", a bot result of "Success", a bot start time of "2/13/2022 17:00:00", a bot end time of "2/13/2022 17:21:00", a bot successful task count of "5", bot failed task count of "0", milestone GUID of "TRANS0349582FKSC245D", bot skill of "Letter Generation", bot user account of "LetterBt1", bot workstation of "AA-AWS15C3", and an optional payload that includes details of three letters that were generated by the corresponding software robot.

Figure 3:
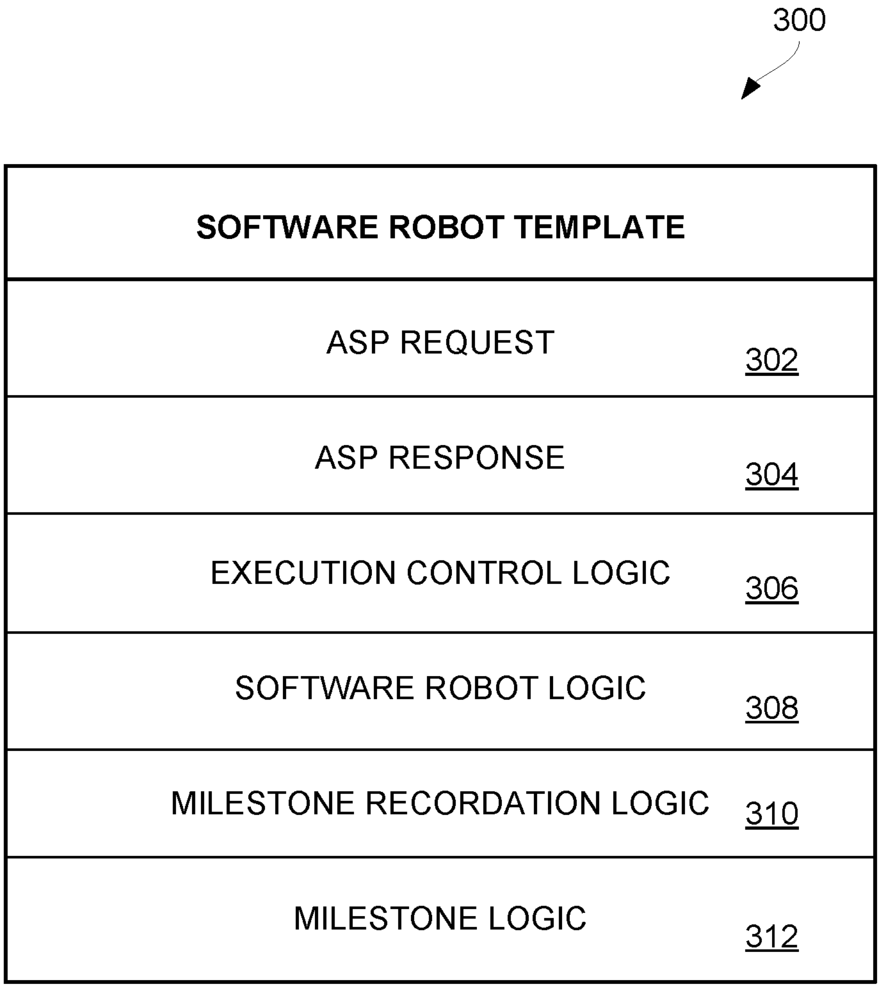
FIG. 3 is a diagram illustrating an exemplary software robot template according to one embodiment.

FIG. 3 is a diagram illustrating an exemplary software robot template 300 according to one embodiment. The exemplary software robot template 300 can include a plurality of regions (or sections) of data and/or programming logic. The exemplary software robot template 300 shown in FIG. 3 includes an automation start permission (ASP) request 302, an ASP response 304, execution control logic 306, and software robot logic 308. The ASP request 302 can include programming code and data to generate and send an ASP request to a remote server, such as the automation management server 208 illustrated in FIG. 2A or 2B. In general, an ASP request is a request from an RPA system seeking permission to start execution of a particular software robot. The ASP response 304 can include programming code to process an ASP response that is received in response to the ASP request 302. The ASP response 304 would normally be received from the remote server. The execution control logic 306 can include programming code to process the ASP response 304. In one implementation, the execution control logic 306 can include program code to parse the ASP response 304 to obtain an ASP, and then determine whether or not the ASP indicates that permission to start execution of the particular software robot has been received. In the event that the ASP is determined to indicate that permission to start execution of the particular software robot has been provided, then program code (and data, if any) included in the software robot logic 308 of the software robot template 300 can be executed. In this embodiment, the program code for the particular software robot is included within the software robot logic 308 of the software robot template 300. Alternatively, the software robot logic 308 can include a pointer or link to a data storage/execution device that includes the program code for the particular software robot.

The software robot template 300 can optionally include milestone recordation logic 310 and milestone logic 312. By providing the software robot template 300 with such regions, the software robot template 300 can facilitate storage of milestones to a milestone database, such as the milestone database 256 illustrated in FIG. 2B. The milestone recordation logic 310 can include programming code to determine if a milestone is to be recorded. When the milestone recordation logic 310 determines that a milestone is to be recorded, then programming code (and data, if any) within the milestone logic 312 can generate and store a milestone to the milestone database. The milestone typically pertains to data detailing execution of the particular software robot. In one implementation, the milestone logic 312 can detail the data to be included in the milestone. In this embodiment, the program code for generation and recordation of the milestone is included within the milestone logic 312 of the software robot template 300. Alternatively, the milestone logic 312 can include a pointer or link to a data storage/execution device that includes the program code for the particular milestone.

Figure 4:
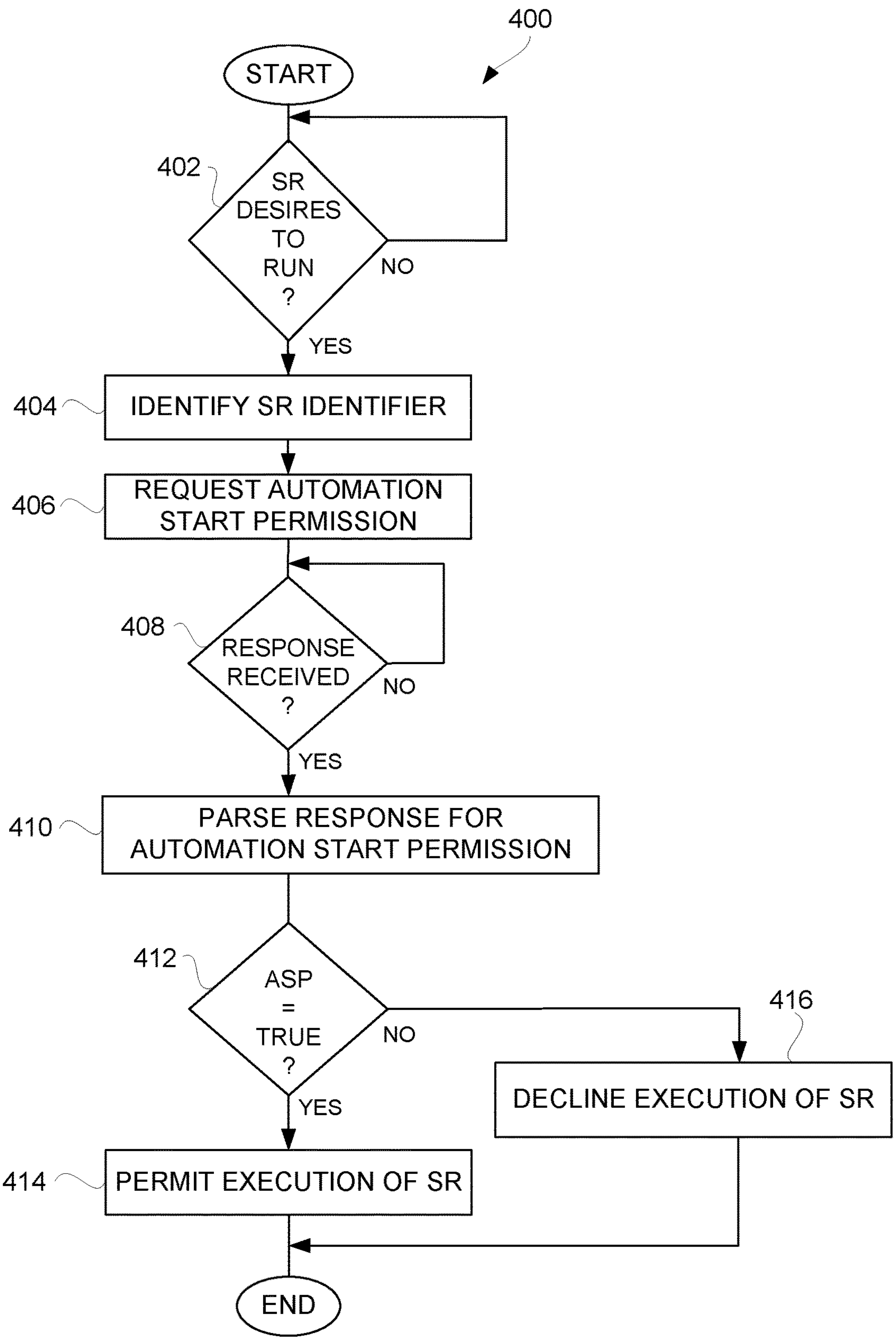
FIG. 4 is a flow diagram of an execution management process according to one embodiment.

FIG. 4 is a flow diagram of an execution management process 400 according to one embodiment. The execution management process 400 can, for example, be performed by an automation platform, such as the automation platform 202 illustrated in FIG. 2A or the automation platform 252 illustrated in FIG. 2B.

The execution management process 400 can begin with a decision 402 that determines whether a software robot desires to run. When the decision 402 determines that a software robot does not presently desire to run (i.e., execute), then the execution management process 400 can await until a software robot desires to run. On the other hand, when the decision 402 determines that a software robot does desire to run, then a SR identifier for the software robot can be identified 404. The SR identifier can be a GUID, which is a unique digital identifier for the corresponding software robot.

An automation start permission (ASP) can then be requested 406 for the software robot. The automation start permission is a request for permission to execute a particular software robot, which is identified by a SR identifier. The automation start permission can be requested 406 from an automation management server, such as the automation management server 208 illustrated in FIG. 2A or 2B. For example, the automation start permission can be requested 406 by an Application Programming Interface (API) call (e.g., from an automation platform or client computing device) to an automation server.

Next, a decision 408 can determine whether a response has been received to the automation start permission that has been requested 406. When the decision 408 determines that a response to the request for the automation start permission as not been received, the execution management process 400 can await such a response. Once the decision 408 determines that a response to the request for automation start permission has been received, the response for the automation start permission can be parsed 410. For example, by parsing 410 the response for the automation start permission, data can be retrieved from the response, including response data. For example, the response data being retrieved from the response can include at least an automation start permission (ASP) for the software robot that desires to run and that is identified by the SR identifier.

A decision 412 can then determine whether the automation start permission is equivalent to "true". When the automation start permission is equivalent to "true", the automation management server has determined that the software robot is permitted to operate, that is, the software robot is approved to execute. More particularly, when the decision 412 determines that the automation start permission is "true", then execution of the software robot can be permitted 414. Alternatively, when the automation start permission is not equivalent to "true", then execution of the software robot can be declined 416.

Figure 5:
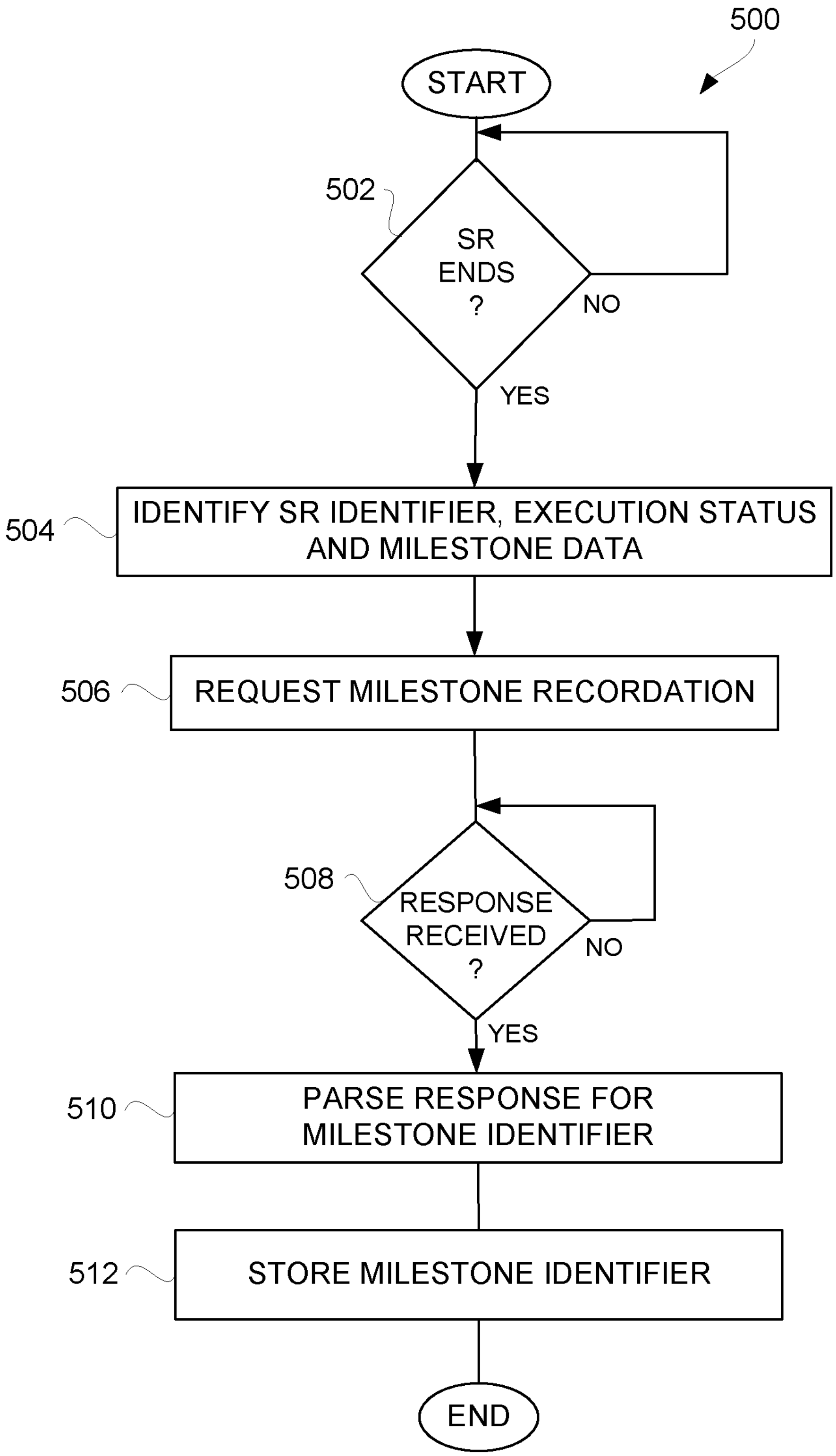
FIG. 5 is a flow diagram of a milestone management process according to one embodiment.

FIG. 5 is a flow diagram of a milestone management process 500 according to one embodiment. The milestone management process 500 can, for example, be performed by a milestone management server, such as the milestone management server 254 illustrated in FIG. 2B.

The milestone management process 500 can begin with a decision 502 that determines whether a software robot has ended its execution. In other words, the decision 502 determines whether a previously executing software robot has ended its execution. When the decision 502 determines that the software robot has not yet ended its execution, the milestone management process 500 awaits its completion. In other words, the milestone management process 500 can be activated after a software robot has completed its execution, regardless of whether its execution ended normally or under an error condition.

When the decision 502 determines that the software robot has ended, then the milestone management process 500 can be performed. In this regard, a SR identifier, execution status, and milestone data can be identified 504 for the software robot that has completed its execution. Next, milestone recordation can be requested 506. Here, a milestone can be formed from at least the SR identifier, the execution status and the milestone data. The milestone, which is a milestone data entry, can then be packaged as a request for the milestone recordation. The request 506 for the milestone recordation can be sent to a milestone management server, such as the milestone management server 254 illustrated in FIG. 2B. The milestone management server can then subsequently cause the milestone to be recorded, such as to the milestone database 256 illustrated in FIG. 2B.

Next, a decision 508 can determine whether a response to the request 506 for the milestone recordation has been received. The response to the request 506 can be received from the milestone management server. When the decision 508 determines that a response to the request for the milestone recordation has not yet been received, the milestone management process 500 can await such a response. Alternatively, when the decision 508 determines that the response to the request for the milestone recordation has been received, the response can be parsed 510 for a milestone identifier. The milestone identifier is a unique identifier for a stored milestone. For example, the milestone identifier can be a milestone GUID. Thereafter, the milestone identifier can be stored 512. The milestone identifier allows the milestone to be subsequently located and retrieved from a milestone database 256. Here, the milestone identifier can be stored 512 at an automation platform, such as the automation platform 252 illustrated in FIG. 2B. Following the storage 512 of the milestone identifier, the milestone management process 500 can end.

Figure 6:
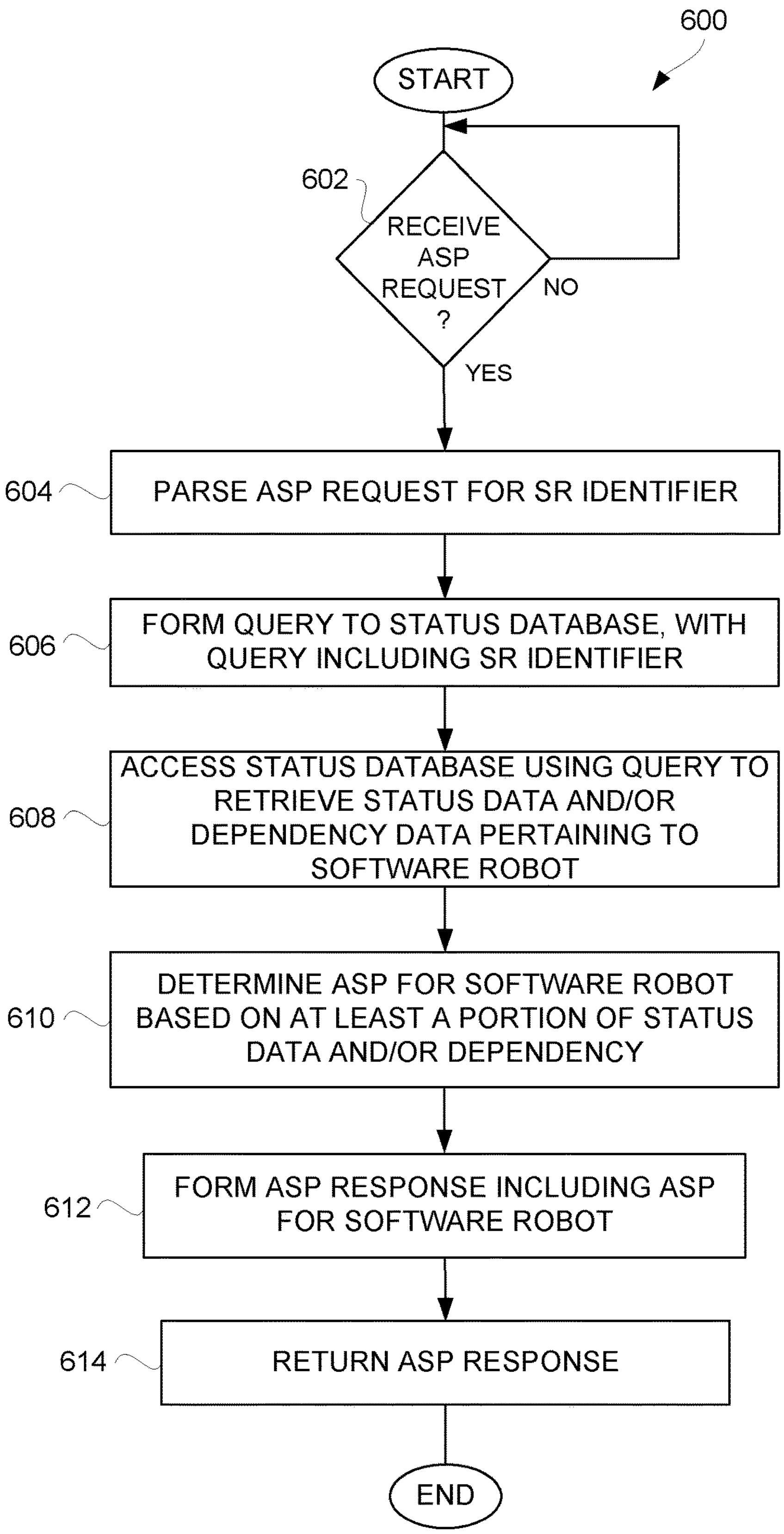
FIG. 6 is a flow diagram of an execution status process according to one embodiment.

FIG. 6 is a flow diagram of an execution status process 600 according to one embodiment. The execution status process 600 is, for example, performed by an automation management server, such as the automation management server 208 illustrated in FIG. 2A or 2B.

The execution status process 600 can begin with a decision 602 that determines whether an automation start permission (ASP) request has been received. The automation start permission request can, for example, be requested by block 406 of the execution management process 400 illustrated in FIG. 4. When the decision 602 determines that an automation start permission request is not yet been received, the execution status process 600 can await such a request.

Alternatively, when the decision 602 determines that an automation start permission request has been received, the execution status process 600 can continue (or be initiated). In this regard, the automation start permission request can be parsed 604 for a SR identifier. The SR identifier serves to uniquely identify the software robot associated with the automation start permission request. Next, a query to a status database can be formed 606, with the query including the SR identifier. The status database can then be accessed 608 using the query to retrieve status data and dependency data pertaining to the software robot associated with the SR identifier.

Next, the automation start permission for the software robot can be determined 610 based on at least a portion of the status data and/or dependency data. Thereafter, an automation start permission response can be formed 612, with the automation start permission response including at least the automation start permission that has been determined for the software robot. Subsequently, the automation start permission response can be returned 614. For example, the automation start permission response can be returned 614 to the issuer of the automation start permission request such as the automation platform 202 illustrated in FIG. 2A, the automation platform 252 illustrated in FIG. 2B or a client computing device.

The execution status process 600 illustrated in FIG. 6, in one embodiment, an automation management server operates to retrieve status data and/or dependency data and then determines an automation start permission for a software robot. In an alternative embodiment, a client computing device could instead receive the status and/or dependency data and then itself determine the automration start permission for the software robot.

Figure 7:
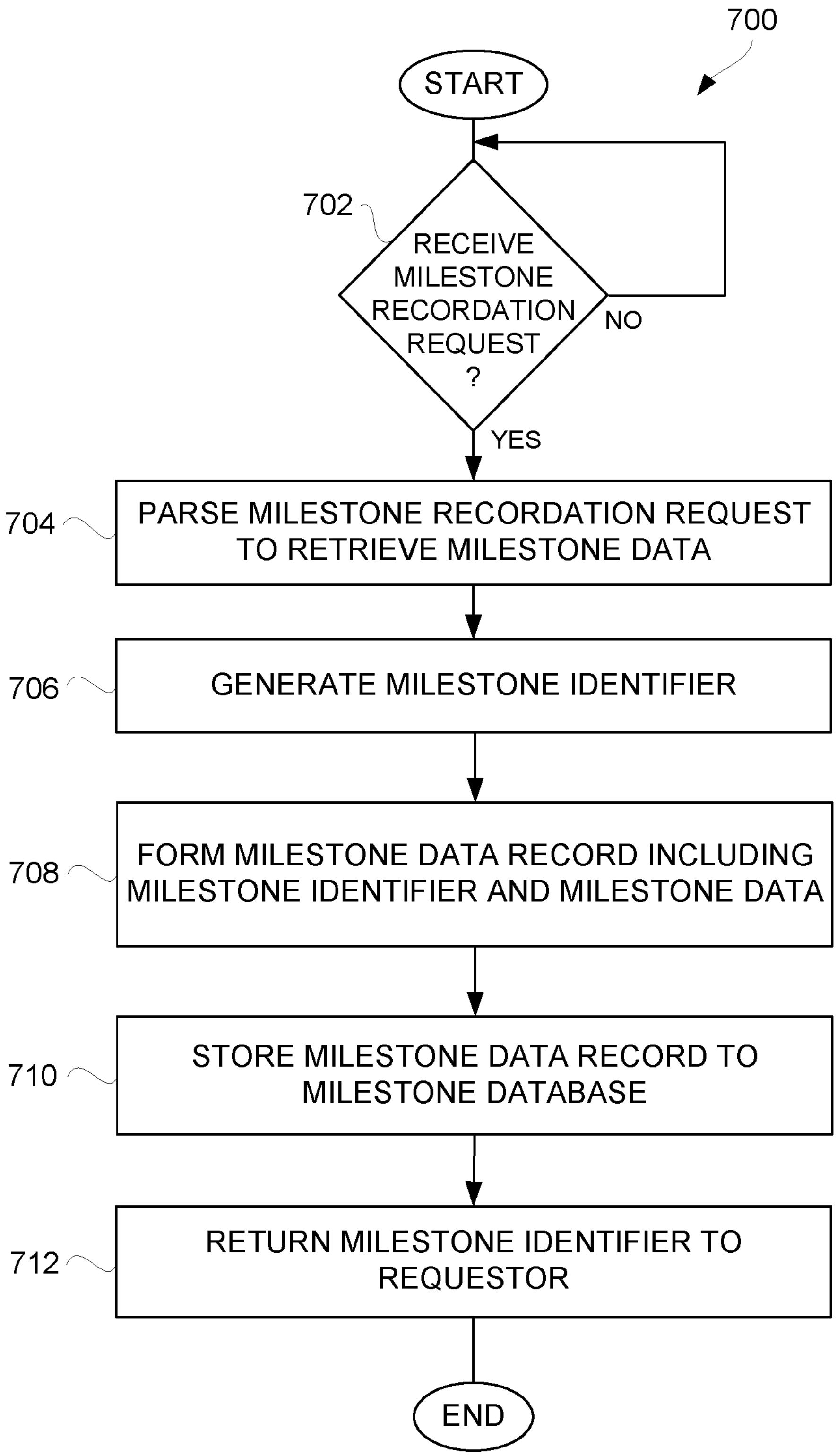
FIG. 7 is a flow diagram of a milestone recordation process according to one embodiment.

FIG. 7 is a flow diagram of a milestone recordation process 700 according to one embodiment. The milestone recordation process 700 is, for example, performed by a milestone management server, such as the milestone management server 254 illustrated in FIG. 2B.

The milestone recordation process 700 can begin with a decision 702 that determines whether a milestone recordation request has been received. The milestone recordation request can, for example, be requested by block 506 of the milestone management process 500 illustrated in FIG. 5, which can be from a milestone management server, such as the milestone management server 254 shown in FIG. 2B. When the decision 702 determines that a milestone recordation request has not yet been received, the milestone recordation process 700 await such a request. On the other hand, when the decision 702 determines that a milestone recordation request has been received, the milestone recordation process 700 can proceed (or be initiated). In other words, the milestone recordation process 700 operates in response to receiving a milestone recordation request.

After the milestone recordation request has been received, the milestone recordation request can be parsed 704 to retrieve milestone data from the milestone recordation request. Then, the milestone recordation process 700 can generate 706 a milestone identifier for the particular milestone to be recorded. The milestone identifier can be a GUID, which is a unique digital identifier for the corresponding milestone. Next, a milestone data record can be formed 708, with the milestone data record including at least the milestone identifier and the milestone data. Thereafter, the milestone data record can be stored 710 to a milestone database. For example, milestone database can pertain to the milestone database 256 illustrated in FIG. 2B. After the milestone data record has been stored 710 to the milestone database, the milestone identifier (or storage record identifier) can be returned 712 to the milestone management server (e.g., milestone management server 254) that requested that the milestone data be recorded. Following the return 712 of the milestone identifier, the milestone recordation process 700 can end.

The various aspects disclosed herein can be utilized with or by robotic process automation systems. Exemplary robotic process automation systems and operations thereof are detailed below.

Figure 8:
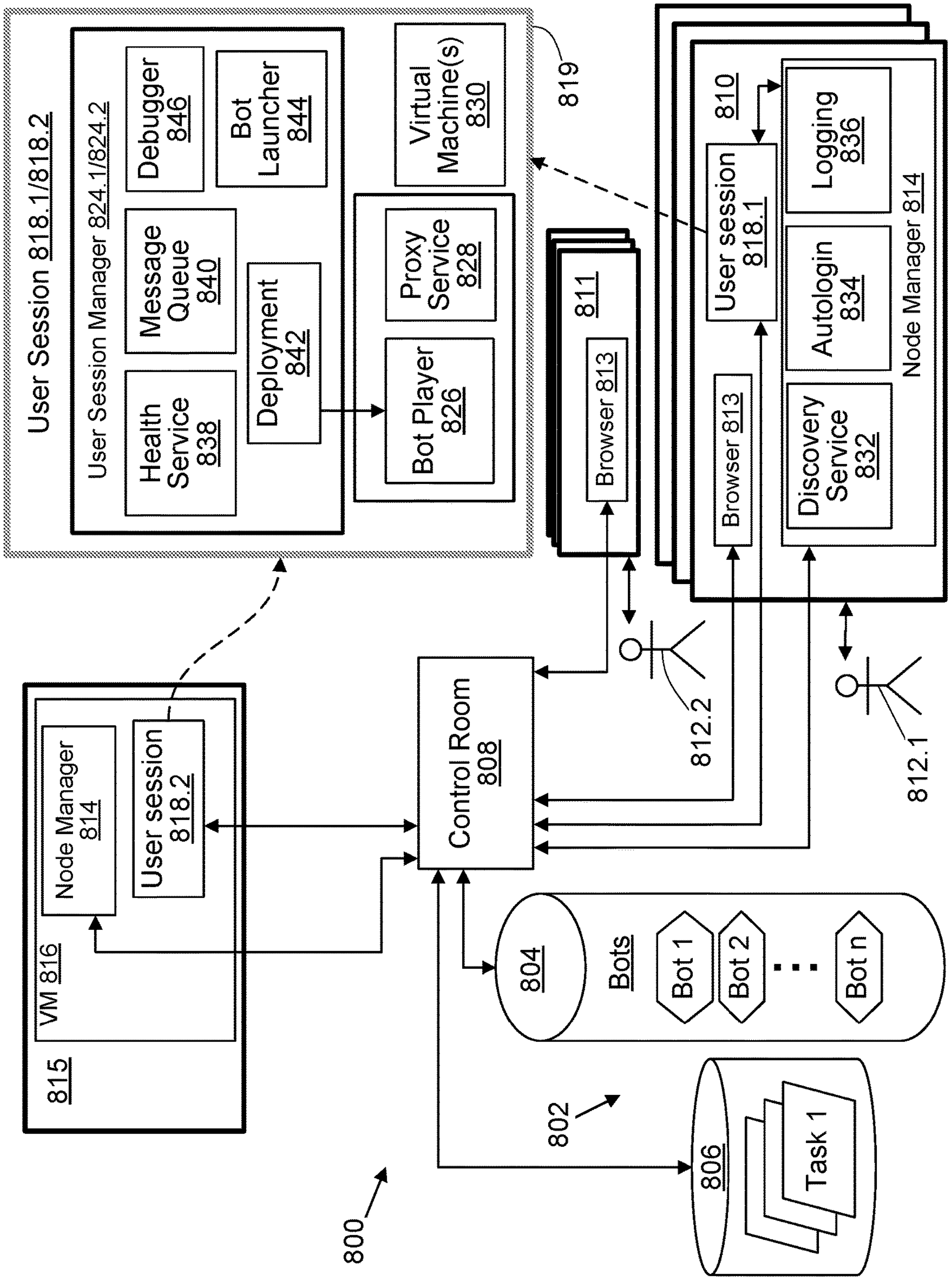
FIG. 8 is a block diagram of a robotic process automation system according to one embodiment.

FIG. 8 is a block diagram of a robotic process automation (RPA) system 800 according to one embodiment. The RPA system 800 includes data storage 802. The data storage 802 can store a plurality of software robots 804, also referred to as bots (e.g., Bot 1, Bot 2, . . . , Bot n). The software robots 804 can be operable to interact at a user level with one or more user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 826), on which a bot will execute or is executing. The data storage 802 can also stores a plurality of work items 806. Each work item 806 can pertain to processing executed by one or more of the software robots 804.

The RPA system 800 can also include a control room 808. The control room 808 is operatively coupled to the data storage 802 and is configured to execute instructions that, when executed, cause the RPA system 800 to respond to a request from a client device 810 that is issued by a user 812.1. The control room 808 can act as a server to provide to the client device 810 the capability to perform an automation task to process a work item from the plurality of work items 806. The RPA system 800 is able to support multiple client devices 810 concurrently, each of which will have one or more corresponding user session(s) 818, which provides a context. The context can, for example, include security, permissions, audit trails, etc. to define the permissions and roles for bots operating under the user session 818. For example, a bot executing under a user session, cannot access any files or use any applications that the user, under whose credentials the bot is operating, does not have permission to do so. This prevents any inadvertent or malicious acts from a bot under which bot 804 executes.

The control room 808 can provide, to the client device 810, software code to implement a node manager 814. The node manager 814 executes on the client device 810 and provides a user 812 a visual interface via browser 813 to view progress of and to control execution of automation tasks. It should be noted that the node manager 814 can be provided to the client device 810 on demand, when required by the client device 810, to execute a desired automation task. In one embodiment, the node manager 814 may remain on the client device 810 after completion of the requested automation task to avoid the need to download it again. In another embodiment, the node manager 814 may be deleted from the client device 810 after completion of the requested automation task. The node manager 814 can also maintain a connection to the control room 808 to inform the control room 808 that device 810 is available for service by the control room 808, irrespective of whether a live user session 818 exists. When executing a bot 804, the node manager 814 can impersonate the user 812 by employing credentials associated with the user 812.

The control room 808 initiates, on the client device 810, a user session 818 (seen as a specific instantiation 818.1) to perform the automation task. The control room 808 retrieves the set of task processing instructions 804 that correspond to the work item 806. The task processing instructions 804 that correspond to the work item 806 can execute under control of the user session 818.1, on the client device 810. The node manager 814 can provide update data indicative of status of processing of the work item to the control room 808. The control room 808 can terminate the user session 818.1 upon completion of processing of the work item 806. The user session 818.1 is shown in further detail at 819, where an instance 824.1 of user session manager 824 is seen along with a bot player 826, proxy service 828, and one or more virtual machine(s) 830, such as a virtual machine that runs Java® or Python®. The user session manager 824 provides a generic user session context within which a bot 804 executes.

The bots 804 execute on a player, via a computing device, to perform the functions encoded by the bot. Some or all of the bots 804 may in certain embodiments be located remotely from the control room 808. Moreover, the devices 810 and 811, which may be conventional computing devices, such as for example, personal computers, server computers, laptops, tablets and other portable computing devices, may also be located remotely from the control room 808. The devices 810 and 811 may also take the form of virtual computing devices. The bots 804 and the work items 806 are shown in separate containers for purposes of illustration but they may be stored in separate or the same device(s), or across multiple devices. The control room 808 can perform user management functions, source control of the bots 804, along with providing a dashboard that provides analytics and results of the bots 804, performs license management of software required by the bots 804 and manages overall execution and management of scripts, clients, roles, credentials, security, etc. The major functions performed by the control room 808 can include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 808 is shown generally for simplicity of explanation. Multiple instances of the control room 808 may be employed where large numbers of bots are deployed to provide for scalability of the RPA system 800.

In the event that a device, such as device 811 (e.g., operated by user 812.2) does not satisfy the minimum processing capability to run a node manager 814, the control room 808 can make use of another device, such as device 815, that has the requisite capability. In such case, a node manager 814 within a Virtual Machine (VM), seen as VM 816, can be resident on the device 815. The node manager 814 operating on the device 815 can communicate with browser 813 on device 811. This approach permits RPA system 800 to operate with devices that may have lower processing capability, such as older laptops, desktops, and portable/mobile devices such as tablets and mobile phones. In certain embodiments the browser 813 may take the form of a mobile application stored on the device 811. The control room 808 can establish a user session 818.2 for the user 812.2 while interacting with the control room 808 and the corresponding user session 818.2 operates as described above for user session 818.1 with user session manager 824 operating on device 810 as discussed above.

In certain embodiments, the user session manager 824 provides five functions. First is a health service 838 that maintains and provides a detailed logging of bot execution including monitoring memory and CPU usage by the bot and other parameters such as number of file handles employed. The bots 804 can employ the health service 838 as a resource to pass logging information to the control room 808. Execution of the bot is separately monitored by the user session manager 824 to track memory, CPU, and other system information. The second function provided by the user session manager 824 is a message queue 840 for exchange of data between bots executed within the same user session 818. The third function is a deployment service (also referred to as a deployment module) 842 that connects to the control room 808 to request execution of a requested bot 804. The deployment service 842 can also ensure that the environment is ready for bot execution, such as by making available dependent libraries. The fourth function is a bot launcher 844 which can read metadata associated with a requested bot 804 and launch an appropriate container and begin execution of the requested bot. The fifth function is a debugger service 846 that can be used to debug bot code.

The bot player 826 can execute, or play back, a sequence of instructions encoded in a bot. The sequence of instructions can, for example, be captured by way of a recorder when a human performs those actions, or alternatively the instructions are explicitly coded into the bot. These instructions enable the bot player 826, to perform the same actions as a human would do in their absence. In one implementation, the instructions can compose of a command (action) followed by set of parameters, for example: Open Browser is a command, and a URL would be the parameter for it to launch a web resource. Proxy service 828 can enable integration of external software or applications with the bot to provide specialized services. For example, an externally hosted artificial intelligence system could enable the bot to understand the meaning of a "sentence."

The user 812.1 can interact with node manager 814 via a conventional browser 813 which employs the node manager 814 to communicate with the control room 808. When the user 812.1 logs in from the client device 810 to the control room 808 for the first time, the user 812.1 can be prompted to download and install the node manager 814 on the device 810, if one is not already present. The node manager 814 can establish a web socket connection to the user session manager 824, deployed by the control room 808 that lets the user 812.1 subsequently create, edit, and deploy the bots 804.

Figure 9:
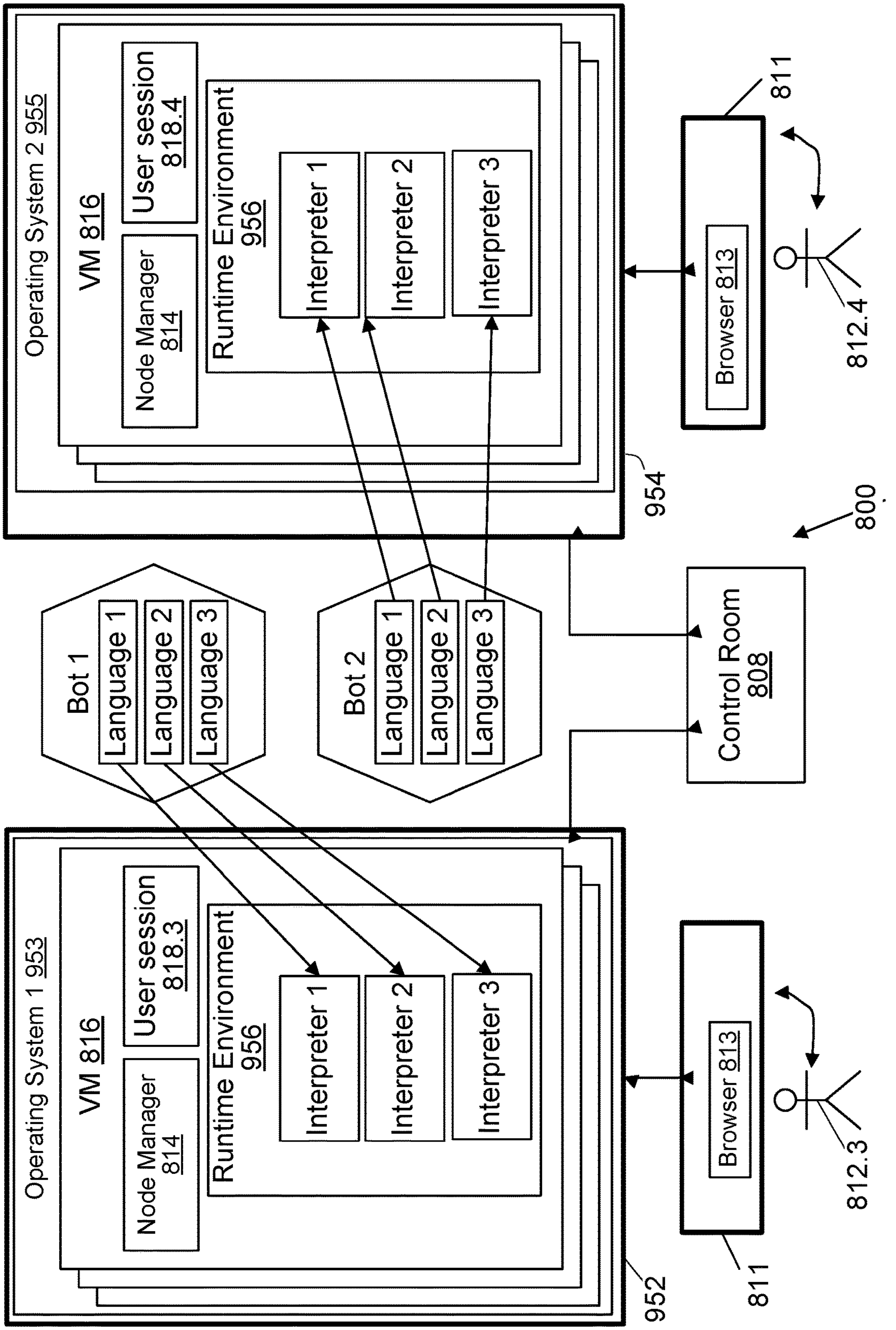
FIG. 9 is a block diagram of a generalized runtime environment for bots in accordance with another embodiment of the robotic process automation system illustrated in FIG. 8.

FIG. 9 is a block diagram of a generalized runtime environment for bots 804 in accordance with another embodiment of the RPA system 800 illustrated in FIG. 8. This flexible runtime environment advantageously permits extensibility of the platform to enable use of various languages in encoding bots. In the embodiment of FIG. 9, RPA system 800 generally operates in the manner described in connection with FIG. 8, except that in the embodiment of FIG. 9, some or all of the user sessions 818 execute within a virtual machine 816. This permits the bots 804 to operate on an RPA system 800 that runs on an operating system different from an operating system on which a bot 804 may have been developed. For example, if a bot 804 is developed on the Windows® operating system, the platform agnostic embodiment shown in FIG. 9 permits the bot 804 to be executed on a device 952 or 954 executing an operating system 953 or 955 different than Windows®, such as, for example, Linux. In one embodiment, the VM 816 takes the form of a Java Virtual Machine (JVM) as provided by Oracle Corporation. As will be understood by those skilled in the art in view of the present disclosure, a JVM enables a computer to run Java® programs as well as programs written in other languages that are also compiled to Java® bytecode.

In the embodiment shown in FIG. 9, multiple devices 952 can execute operating system 1, 953, which may, for example, be a Windows® operating system. Multiple devices 954 can execute operating system 2, 955, which may, for example, be a Linux® operating system. For simplicity of explanation, two different operating systems are shown, by way of example and additional operating systems such as the macOS®, or other operating systems may also be employed on devices 952, 954 or other devices. Each device 952, 954 has installed therein one or more VM's 816, each of which can execute its own operating system (not shown), which may be the same or different than the host operating system 953/955. Each VM 816 has installed, either in advance, or on demand from control room 808, a node manager 814. The embodiment illustrated in FIG. 9 differs from the embodiment shown in FIG. 8 in that the devices 952 and 954 have installed thereon one or more VMs 816 as described above, with each VM 816 having an operating system installed that may or may not be compatible with an operating system required by an automation task. Moreover, each VM has installed thereon a runtime environment 956, each of which has installed thereon one or more interpreters (shown as interpreter 1, interpreter 2, interpreter 3). Three interpreters are shown by way of example but any run time environment 956 may, at any given time, have installed thereupon less than or more than three different interpreters. Each interpreter 956 is specifically encoded to interpret instructions encoded in a particular programming language. For example, interpreter 1 may be encoded to interpret software programs encoded in the Java® programming language, seen in FIG. 9 as language 1 in Bot 1 and Bot 2. Interpreter 2 may be encoded to interpret software programs encoded in the Python® programming language, seen in FIG. 9 as language 2 in Bot 1 and Bot 2, and interpreter 3 may be encoded to interpret software programs encoded in the R programming language, seen in FIG. 9 as language 3 in Bot 1 and Bot 2.

Turning to the bots Bot 1 and Bot 2, each bot may contain instructions encoded in one or more programming languages. In the example shown in FIG. 9, each bot can contain instructions in three different programming languages, for example, Java®, Python® and R. This is for purposes of explanation and the embodiment of FIG. 9 may be able to create and execute bots encoded in more or less than three programming languages. The VMs 816 and the runtime environments 956 permit execution of bots encoded in multiple languages, thereby permitting greater flexibility in encoding bots. Moreover, the VMs 816 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 808 will select a device with a VM 816 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 10:
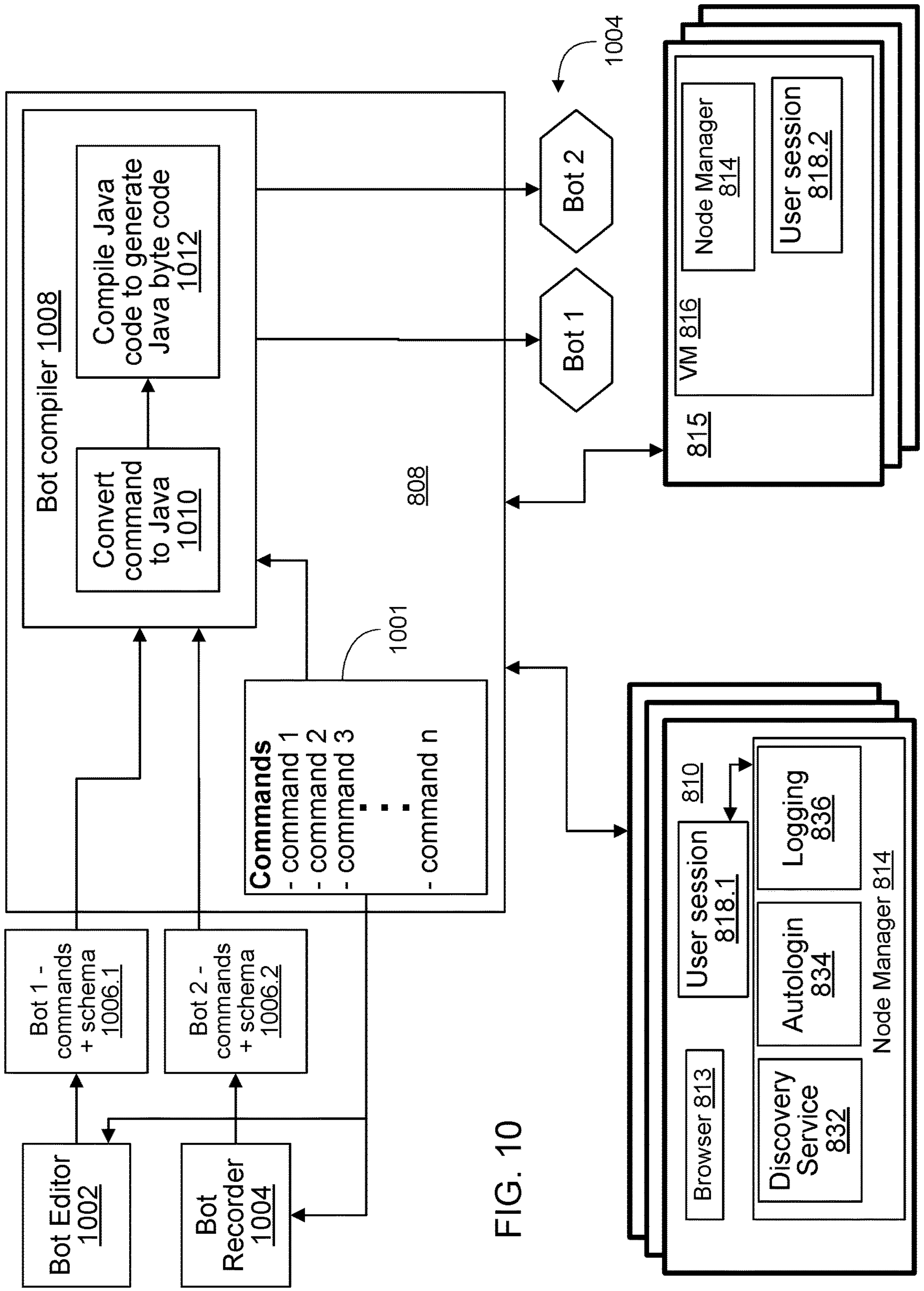
FIG. 10 is yet another embodiment of the robotic process automation system of FIG. 8 configured to provide platform independent sets of task processing instructions for bots.

FIG. 10 illustrates a block diagram of yet another embodiment of the RPA system 800 of FIG. 8 configured to provide platform independent sets of task processing instructions for bots 804. Two bots 804, bot 1 and bot 2 are shown in FIG. 10. Each of bots 1 and 2 are formed from one or more commands 1001, each of which specifies a user level operation with a specified application program, or a user level operation provided by an operating system. Sets of commands 1006.1 and 1006.2 may be generated by bot editor 1002 and bot recorder 1004, respectively, to define sequences of application level operations that are normally performed by a human user. The bot editor 1002 may be configured to combine sequences of commands 1001 via an editor. The bot recorder 1004 may be configured to record application level operations performed by a user and to convert the operations performed by the user to commands 1001. The sets of commands 1006.1 and 1006.2 generated by the editor 1002 and the recorder 1004 can include command(s) and schema for the command(s), where the schema defines the format of the command(s). The format of a command can, such as, includes the input(s) expected by the command and their format. For example, a command to open a URL might include the URL, a user login, and a password to login to an application resident at the designated URL.

The control room 808 operates to compile, via compiler 1008, the sets of commands generated by the editor 1002 or the recorder 1004 into platform independent executables, each of which is also referred to herein as a bot JAR (Java ARchive) that perform application level operations captured by the bot editor 1002 and the bot recorder 1004. In the embodiment illustrated in FIG. 10, the set of commands 1006, representing a bot file, can be captured in a JSON (JavaScript Object Notation) format which is a lightweight data-interchange text-based format. JSON is based on a subset of the JavaScript Programming Language Standard ECMA-262 3rd Edition-December 1999. JSON is built on two structures: (i) a collection of name/value pairs; in various languages, this is realized as an object, record, struct, dictionary, hash table, keyed list, or associative array, (ii) an ordered list of values which, in most languages, is realized as an array, vector, list, or sequence. Bots 1 and 2 may be executed on devices 810 and/or 815 to perform the encoded application level operations that are normally performed by a human user.

Figure 11:
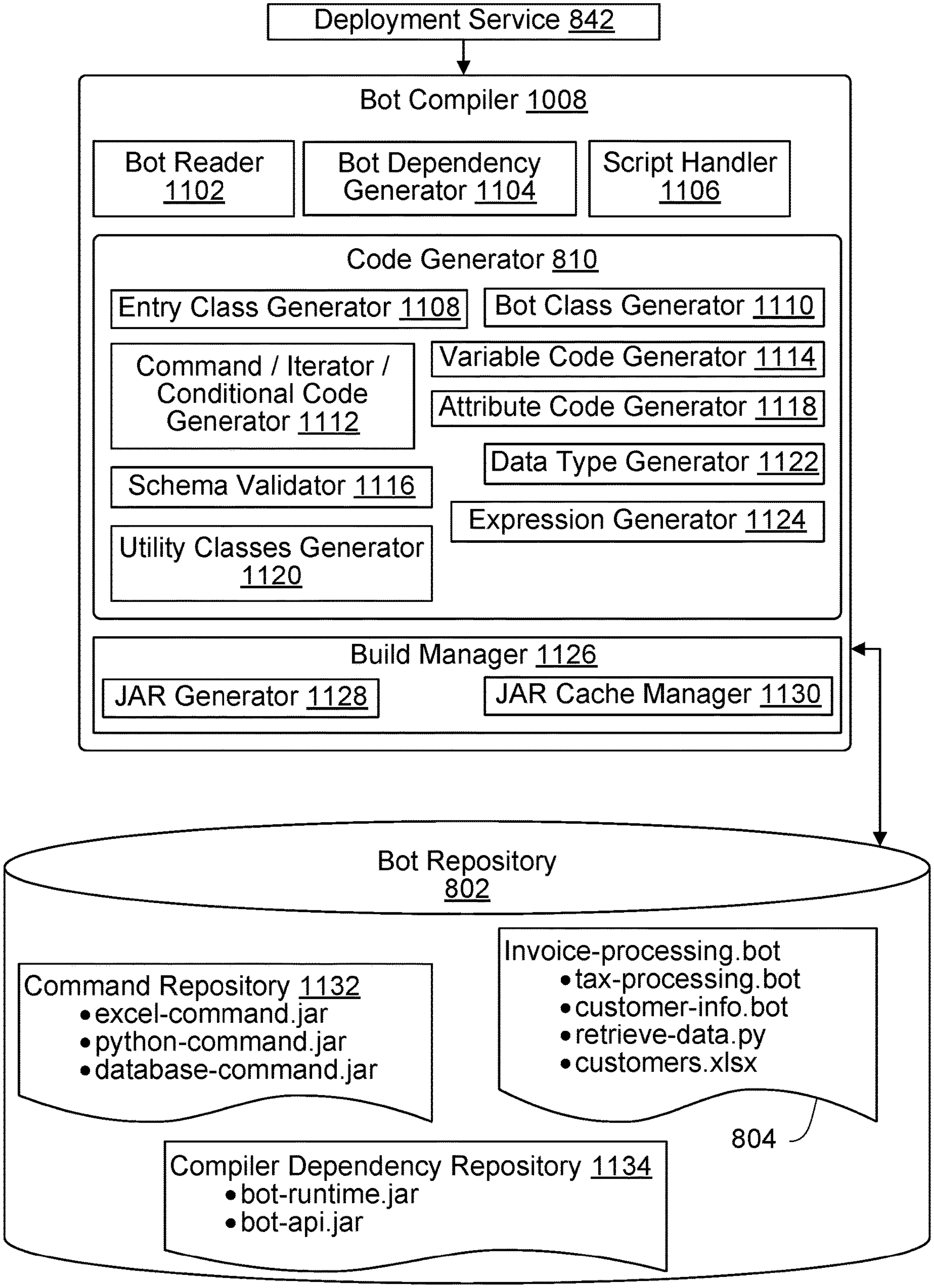
FIG. 11 is a block diagram illustrating details of one embodiment of the bot compiler illustrated in FIG. 10.

FIG. 11 is a block diagram illustrating details of one embodiment of the bot compiler 1008 illustrated in FIG. 10. The bot compiler 1008 accesses one or more of the bots 804 from the data storage 802, which can serve as bot repository, along with commands 1001 that are contained in a command repository 1132. The bot compiler 808 can also access compiler dependency repository 1134. The bot compiler 808 can operate to convert each command 1001 via code generator module 1010 to an operating system independent format, such as a Java command. The bot compiler 808 then compiles each operating system independent format command into byte code, such as Java byte code, to create a bot JAR. The convert command to Java module 1010 is shown in further detail in in FIG. 11 by JAR generator 1128 of a build manager 1126. The compiling to generate Java byte code module 1012 can be provided by the JAR generator 1128. In one embodiment, a conventional Java compiler, such as javac from Oracle Corporation, may be employed to generate the bot JAR (artifacts). As will be appreciated by those skilled in the art, an artifact in a Java environment includes compiled code along with other dependencies and resources required by the compiled code. Such dependencies can include libraries specified in the code and other artifacts. Resources can include web pages, images, descriptor files, other files, directories and archives.

As noted in connection with FIG. 10, deployment service 842 can be responsible to trigger the process of bot compilation and then once a bot has compiled successfully, to execute the resulting bot JAR on selected devices 810 and/or 815. The bot compiler 1008 can comprises a number of functional modules that, when combined, generate a bot 804 in a JAR format. A bot reader 1102 loads a bot file into memory with class representation. The bot reader 1102 takes as input a bot file and generates an in-memory bot structure. A bot dependency generator 1104 identifies and creates a dependency graph for a given bot. It includes any child bot, resource file like script, and document or image used while creating a bot. The bot dependency generator 1104 takes, as input, the output of the bot reader 1102 and provides, as output, a list of direct and transitive bot dependencies. A script handler 1106 handles script execution by injecting a contract into a user script file. The script handler 1106 registers an external script in manifest and bundles the script as a resource in an output JAR. The script handler 1106 takes, as input, the output of the bot reader 1102 and provides, as output, a list of function pointers to execute different types of identified scripts like Python, Java, VB scripts.

An entry class generator 1108 can create a Java class with an entry method, to permit bot execution to be started from that point. For example, the entry class generator 1108 takes, as an input, a parent bot name, such "Invoice-processing-.bot" and generates a Java class having a contract method with a predefined signature. A bot class generator 1110 can generate a bot class and orders command code in sequence of execution. The bot class generator 1110 can take, as input, an in-memory bot structure and generates, as output, a Java class in a predefined structure. A Command/Iterator/Conditional Code Generator 1112 wires up a command class with singleton object creation, manages nested command linking, iterator (loop) generation, and conditional (If/Else If/Else) construct generation. The Command/Iterator/Conditional Code Generator 1112 can take, as input, an in-memory bot structure in JSON format and generates Java code within the bot class. A variable code generator 1114 generates code for user defined variables in the bot, maps bot level data types to Java language compatible types, and assigns initial values provided by user. The variable code generator 1114 takes, as input, an in-memory bot structure and generates Java code within the bot class. A schema validator 1116 can validate user inputs based on command schema and includes syntax and semantic checks on user provided values. The schema validator 1116 can take, as input, an in-memory bot structure and generates validation errors that it detects. The attribute code generator 1118 can generate attribute code, handles the nested nature of attributes, and transforms bot value types to Java language compatible types. The attribute code generator 1118 takes, as input, an in-memory bot structure and generates Java code within the bot class. A utility classes generator 1120 can generate utility classes which are used by an entry class or bot class methods. The utility classes generator 1120 can generate, as output, Java classes. A data type generator 1122 can generate value types useful at runtime. The data type generator 1122 can generate, as output, Java classes. An expression generator 1124 can evaluate user inputs and generates compatible Java code, identifies complex variable mixed user inputs, inject variable values, and transform mathematical expressions. The expression generator 1124 can take, as input, user defined values and generates, as output, Java compatible expressions.

The JAR generator 1128 can compile Java source files, produces byte code and packs everything in a single JAR, including other child bots and file dependencies. The JAR generator 1128 can take, as input, generated Java files, resource files used during the bot creation, bot compiler dependencies, and command packages, and then can generate a JAR artifact as an output. The JAR cache manager 1130 can put a bot JAR in cache repository so that recompilation can be avoided if the bot has not been modified since the last cache entry. The JAR cache manager 1130 can take, as input, a bot JAR.

In one or more embodiment described herein command action logic can be implemented by commands 1001 available at the control room 808. This permits the execution environment on a device 810 and/or 815, such as exists in a user session 818, to be agnostic to changes in the command action logic implemented by a bot 804. In other words, the manner in which a command implemented by a bot 804 operates need not be visible to the execution environment in which a bot 804 operates. The execution environment is able to be independent of the command action logic of any commands implemented by bots 804. The result is that changes in any commands 1001 supported by the RPA system 800, or addition of new commands 1001 to the RPA system 800, do not require an update of the execution environment on devices 810, 815. This avoids what can be a time and resource intensive process in which addition of a new command 1001 or change to any command 1001 requires an update to the execution environment to each device 810, 815 employed in an RPA system. Take, for example, a bot that employs a command 1001 that logs into an on-online service. The command 1001 upon execution takes a Uniform Resource Locator (URL), opens (or selects) a browser, retrieves credentials corresponding to a user on behalf of whom the bot is logging in as, and enters the user credentials (e.g., username and password) as specified. If the command 1001 is changed, for example, to perform two-factor authentication, then it will require an additional resource (the second factor for authentication) and will perform additional actions beyond those performed by the original command (for example, logging into an email account to retrieve the second factor and entering the second factor). The command action logic will have changed as the bot is required to perform the additional changes. Any bot(s) that employ the changed command will need to be recompiled to generate a new bot JAR for each changed bot and the new bot JAR will need to be provided to a bot runner upon request by the bot runner. The execution environment on the device that is requesting the updated bot will not need to be updated as the command action logic of the changed command is reflected in the new bot JAR containing the byte code to be executed by the execution environment.

The embodiments herein can be implemented in the general context of computer-executable instructions, such as those included in program modules, being executed in a computing system on a target, real or virtual, processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may further include a device or product having content stored thereon at a time of sale or delivery. Thus, delivering a device with stored content, or offering content for download over a communication medium, may be understood as providing an article of manufacture with such content described herein.

Figure 12:
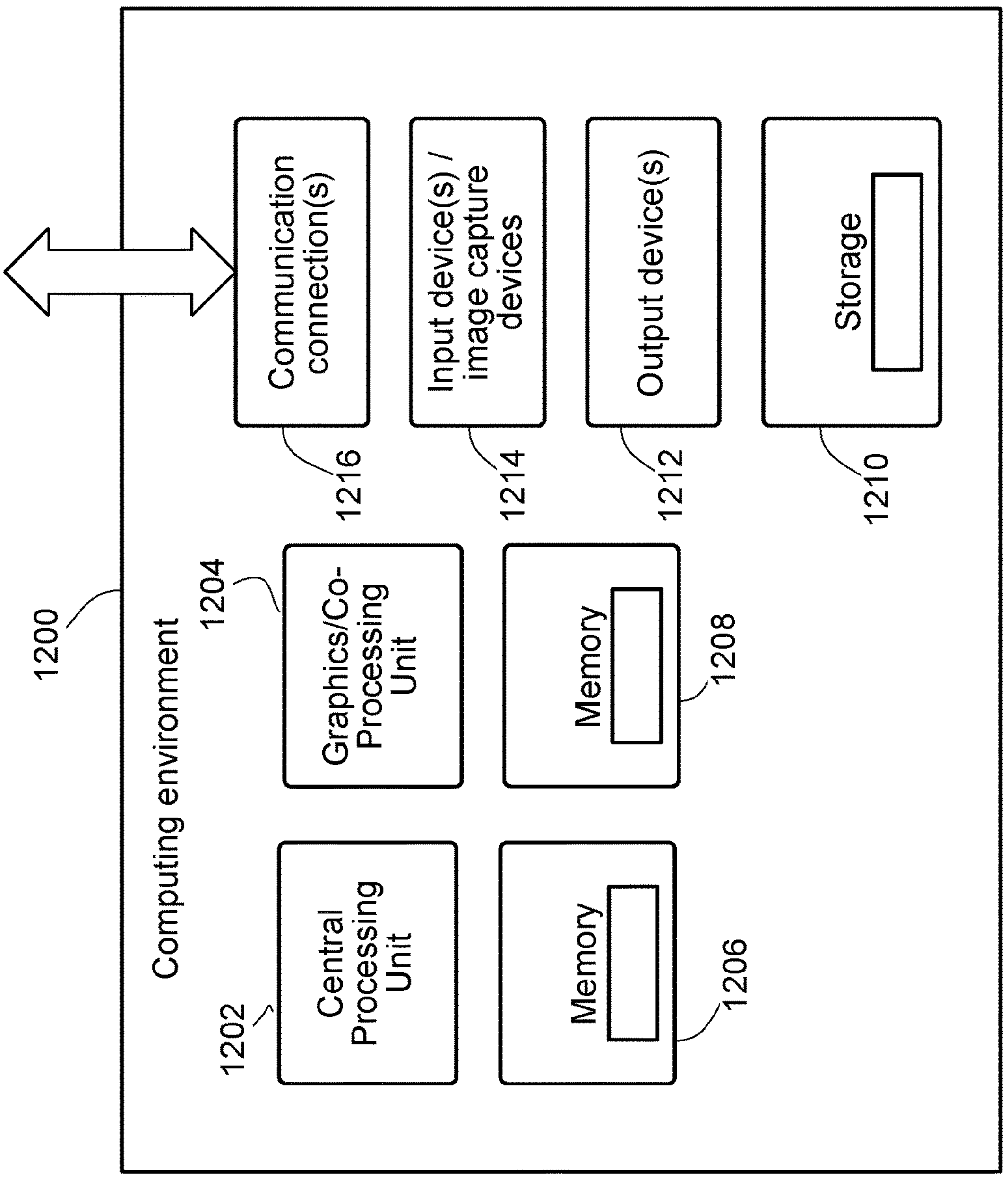
FIG. 12 is a block diagram of an exemplary computing environment for an implementation of a robotic process automation system.

FIG. 12 illustrates a block diagram of an exemplary computing environment 1200 for an implementation of an RPA system, such as the RPA systems disclosed herein. The embodiments described herein may be implemented using the exemplary computing environment 1200. The exemplary computing environment 1200 includes one or more processing units 1202, 1204 and memory 1206, 1208. The processing units 1202, 1206 execute computer-executable instructions. Each of the processing units 1202, 1206 can be a general-purpose central processing unit (CPU), processor in an application-specific integrated circuit (ASIC) or any other type of processor. For example, as shown in FIG. 12, the processing unit 1202 can be a CPU, and the processing unit can be a graphics/co-processing unit (GPU). The tangible memory 1206, 1208 may be volatile memory (e.g., registers, cache, RAM), non-volatile memory (e.g., ROM, EEPROM, flash memory, etc.), or some combination of the two, accessible by the processing unit(s). The hardware components may be standard hardware components, or alternatively, some embodiments may employ specialized hardware components to further increase the operating efficiency and speed with which the RPA system operates. The various components of exemplary computing environment 1200 may be rearranged in various embodiments, and some embodiments may not require nor include all of the above components, while other embodiments may include additional components, such as specialized processors and additional memory.

The exemplary computing environment 1200 may have additional features such as, for example, tangible storage 1210, one or more input devices 1214, one or more output devices 1212, and one or more communication connections 1216. An interconnection mechanism (not shown) such as a bus, controller, or network can interconnect the various components of the exemplary computing environment 1200. Typically, operating system software (not shown) provides an operating system for other software executing in the exemplary computing environment 1200, and coordinates activities of the various components of the exemplary computing environment 1200.

The tangible storage 1210 may be removable or non-removable, and includes magnetic disks, magnetic tapes or cassettes, CD-ROMs, DVDs, or any other medium which can be used to store information in a non-transitory way, and which can be accessed within the computing system 1200. The tangible storage 1210 can store instructions for the software implementing one or more features of a PRA system as described herein.

The input device(s) or image capture device(s) 1214 may include, for example, one or more of a touch input device (such as a keyboard, mouse, pen, or trackball), a voice input device, a scanning device, an imaging sensor, touch surface, or any other device capable of providing input to the exemplary computing environment 1200. For multimedia embodiment, the input device(s) 1214 can, for example, include a camera, a video card, a TV tuner card, or similar device that accepts video input in analog or digital form, a microphone, an audio card, or a CD-ROM or CD-RW that reads audio/video samples into the exemplary computing environment 1200. The output device(s) 1212 can, for example, include a display, a printer, a speaker, a CD-writer, or any another device that provides output from the exemplary computing environment 1200.

The one or more communication connections 1216 can enable communication over a communication medium to another computing entity. The communication medium conveys information such as computer-executable instructions, audio or video input or output, or other data. The communication medium can include a wireless medium, a wired medium, or a combination thereof.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for improving reliability, traceability, and execution management of software robots in a robotic process automation system by centrally recording execution milestones, the method comprising:

determining one or more computing resources utilized by a software robot, of one or more software robots, for execution of a corresponding task;

automatically evaluating availability of the one or more computing resources prior to commencement of the execution of the corresponding task by the software robot of the one or more software robots;

preventing the software robot of the one or more software robots from executing the corresponding task upon determining that the one or more computing resources are unavailable;

identifying the software robot from the one or more software robots that has concluded the execution, the software robot being identified by a software robot (SR) identifier;

obtaining milestone data associated with the software robot that has concluded the execution, wherein to conclude the execution, the software robot performs a plurality of tasks, wherein the milestone data includes a plurality of success or failure indicators, and each success or failure indicator corresponds to a respective skill type;

requesting, via a request to a milestone recordation service, a recordation of a milestone, the milestone being associated with the execution that has concluded for the software robot, the milestone including at least the milestone data;

subsequently receiving a response from the milestone recordation service;

parsing the response to obtain at least a milestone identifier corresponding to the milestone; and storing the milestone identifier for subsequent retrieval of the milestone using the milestone identifier.

2. The method of claim 1, wherein the milestone data to be included in the milestone is identified by the request.

3. The method of claim 1, wherein the milestone data includes at least the SR identifier, a success or failure indication, and task count.

4. The method of claim 3, wherein the task count includes at least a completed task count.

5. The method of claim 3, wherein the milestone data includes a skill carried out by the software robot.

6. The method of claim 3, wherein the milestone data includes at least a designator denoting a user of the software robot.

7. The method of claim 3, wherein the milestone data includes at least customized additional data that a user of the software robot specifies in the request to the milestone recordation service.

8. The method of claim 1, wherein the software robot performs the plurality of tasks in order to conclude the execution, and each of the plurality of tasks are designated to have one or more skill types.

9. The method of claim 1, wherein the milestone data includes at least a payload provided by the software robot that is to be included in the milestone.

10. The method of claim 1, wherein the requesting recordation of the milestone comprises issuing at least an Application Programming Interface (API) call to the milestone recordation service, the API call includes at least the milestone data associated with the software robot that has concluded the execution.

11. The method of claim 1 further comprises:

receiving, at a milestone management server, a milestone recordation request pertaining to the software robot that has at least partially concluded the execution, the milestone recordation request including the milestone data associated with the software robot;

parsing the milestone recordation request to retrieve at least the milestone data;

generating the milestone identifier;

forming a milestone data record including the milestone identifier and the milestone data; and storing the milestone data record to a milestone database.

12. The method of claim 11, wherein the method comprises:

after the storing of the milestone data record, returning the milestone identifier, the milestone identifier being returned in response to the milestone recordation request.

13. The method of claim 11, wherein the milestone data includes at least the software robot (SR) identifier, a success or failure indication, and task count.

14. The method of claim 13, wherein the task count includes at least a completed task count.

15. The method of claim 11, wherein the milestone data includes at least a skill carried out by the software robot.

16. An automation management system for software robots, the automation management system comprises:

a milestone database configured to store milestones concerning a plurality of software robots; and a milestone management server operatively coupled to the milestone database, the milestone management server being configured to at least:

receive a milestone recordation request pertaining to a software robot that has at least partially executed, the milestone recordation request including at least milestone data for the software robot, wherein to conclude the execution, the software robot performs a plurality of tasks, wherein the milestone data includes a plurality of success or failure indicators, and each success or failure indicator corresponds to a respective skill type;

parse the milestone recordation request to retrieve at least the milestone data;

generate a milestone identifier;

form a milestone data record including the milestone identifier and the milestone data; and store the milestone data record to the milestone database; and an automation management server operatively coupled to at least the milestone management server, the automation management server being configured to at least:

determine one or more computing resources utilized by the software robot, of one or more software robots, for execution of a corresponding task;

automatically evaluate availability of the one or more computing resources prior to commencement of the execution of the corresponding task by the software robot; and prevent the software robot from executing the corresponding task upon determining that the one or more computing resources are unavailable.

17. The automation management system of claim 16, wherein the automation management system comprising:

a data storage device that stores at least one computer readable template, the at least one computer readable template including at least:

a milestone recordation code section including program code to request a milestone recordation be made to the milestone database to store the milestone data associated with the software robot that has at least partially executed.

18. The automation management system of claim 17, wherein the at least one computer readable template including at least:

a permission call code section including program code to initiate a request for permission to execute the software robot;

a software robot code section including program code of the software robot; and an execution control code section including program code to initiate execution of the program code of the software robot provided at least in part in the software robot code section, the program code to initiate execution of the program code of the software robot is configured to operate to initiate execution of the program code of the software robot provided that permission to execute is returned in response to the permission call code section.

19. The automation management system of claim 16, wherein the automation management system is configured to at least:

register the plurality of software robots with the automation management system, the registering providing descriptive data pertaining to each of the plurality of software robots; and maintain milestones for each of the plurality of software robots in the milestone database.

* * * * *